(12) United States Patent
Lai et al.

(10) Patent No.: US 11,841,483 B2
(45) Date of Patent: Dec. 12, 2023

(54) OPTICAL LENS INCLUDING FIVE LENSES OF --+-+, --+++ OR --+-+, OR SIX LENSES OF ---+-+ OR --++-+ REFRACTIVE POWERS

(71) Applicant: Rays Optics Inc., Hukou Township (TW)

(72) Inventors: Ching-Lung Lai, Hukou Township (TW); Hung-You Cheng, Hukou Township (TW); Hsin-Te Chen, Hukou Township (TW); Sheng-Tang Lai, Hukou Township (TW)

(73) Assignee: RAYS OPTICS INC., Hsinchu County (TW)

( * ) Notice: Subject to any disclaimer, the term of this patent is extended or adjusted under 35 U.S.C. 154(b) by 148 days.

(21) Appl. No.: 16/685,208

(22) Filed: Nov. 15, 2019

(65) Prior Publication Data

US 2020/0192066 A1   Jun. 18, 2020

(30) Foreign Application Priority Data

Dec. 14, 2018   (TW) ................... 107145161

(51) Int. Cl.
  *G02B 13/00*   (2006.01)
  *G02B 9/62*    (2006.01)
  *G02B 9/60*    (2006.01)

(52) U.S. Cl.
  CPC .......... *G02B 13/0045* (2013.01); *G02B 9/60* (2013.01); *G02B 9/62* (2013.01); *G02B 13/006* (2013.01)

(58) Field of Classification Search
  CPC ......... G02B 13/0045; G02B 9/62; G02B 9/60
  See application file for complete search history.

(56) References Cited

U.S. PATENT DOCUMENTS

| 2010/0188757 | A1* | 7/2010 | Saitoh | G02B 13/0045 |
| | | | | 359/715 |
| 2017/0307851 | A1* | 10/2017 | Chen | G02B 9/62 |
| 2019/0064483 | A1* | 2/2019 | Chen | G02B 9/62 |
| 2019/0324232 | A1* | 10/2019 | Yang | G02B 9/64 |

FOREIGN PATENT DOCUMENTS

CN   104360462 B   *   2/2017   ......... G02B 13/0045

* cited by examiner

*Primary Examiner* — Wen Huang
(74) *Attorney, Agent, or Firm* — Muncy, Geissler, Olds & Lowe, P.C.

(57) ABSTRACT

An optical lens includes a first lens group, a second lens group and an aperture stop. The first lens group includes three lenses with refractive powers. The second lens group has a positive refractive power and includes two lenses with refractive power. The aperture stop is disposed between the first lens group and the second lens group. The optical lens satisfies the conditions of 2 mm<DL<6 mm, LT<15 mm and 0.2<DL/LT<0.38, where DL is a diameter of a lens surface of the second lens group furthest from the first lens group, and LT is a length measured on the optical axis between two outermost lens surfaces of the optical lens.

20 Claims, 20 Drawing Sheets

OPTICAL LENS INCLUDING FIVE LENSES OF --+-+, --+++ OR --+-+, OR SIX LENSES OF ---+-+ OR --++-+ REFRACTIVE POWERS

BACKGROUND OF THE INVENTION a. Field of the Invention

The invention relates generally to an optical system, and more particularly to an optical lens.

b. Description of the Related Art

Recent advances in technology have led to the development of various types of optical lenses. For example, an image pick-up lens used in a surveillance camera, an in-vehicle camera or an action camera is a commonly used optical lens. Nowadays, there is a growing need for an optical lens to be miniaturized and have high optical performance. To meet these requirements, the optical lens needs to have low fabrication costs, high resolution, large effective aperture, wide viewing angles, low thermal shift and reduced occupied space. Therefore, it is desirable to provide an optical lens that may achieve miniaturization, wider viewing angles, lower thermal shift, reduced fabrication costs, and better imaging quality.

BRIEF SUMMARY OF THE INVENTION

According to one aspect of the present disclosure, an optical lens includes a first lens group, a second lens group and an aperture stop. The first lens group includes three lenses with refractive powers, and the three lenses include a spherical lens and an aspheric lens. The second lens group has a positive refractive power and includes two lenses with refractive power, and the two lenses include an aspheric lens. The aperture stop is disposed between the first lens group and the second lens group, where a total number of lenses in the optical lens is less than 9, and the optical lens satisfies the conditions of 2 mm<DL<6 mm, LT<15 mm and 0.2<DL/LT<0.38, where DL is a diameter of a lens surface of the second lens group furthest from the first lens group, and LT is a length measured on the optical axis between two outermost lens surfaces of the optical lens.

According to another aspect of the present disclosure, an optical lens includes a first lens, a second lens, a third lens, a fourth lens and a fifth lens arranged in order from a magnified side to a minified side, the second lens and the fifth lens are aspheric lenses, and a total number of lenses in the optical lens is less than 9. The optical lens satisfies the conditions of 0.5 mm<EFL<1.5 mm, D1<13.3 mm, LT<15 mm and 0.05<EFL/LT<0.1, where EFL is an effective focal length of the optical lens, D1 is a diameter of a lens surface of the first lens furthest from the second lens, and LT is a length measured on the optical axis between two outermost lens surfaces of the optical lens.

According to the above embodiments, the optical lens may achieve high optical performance, low thermal shift, wide viewing angles, low fabrication costs and good imaging quality. Further, a total number of lenses can be reduced to 5-8, and a total track length can be decreased to be smaller than 18 mm. Therefore, an optical lens having large effective aperture, high resolution, wide viewing angles, low thermal shift, reduced occupied space, low fabrication costs and good imaging quality can be provided.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.). The following embodiments of a zoom lens may be applied to any system or environment according to actual demands.

The term "optical element" refers to an element made from at least in part a material that may refract, reflect, diffract, diffuse or filter at least a portion of the light passing through it. The material may include plastic or glass, and the optical element may be, for example, a lens, a prism or an aperture stop.

In an image-pickup system, a magnified side may refer to one side of an optical path of an optical lens comparatively near a subject to be picked-up, and a minified side may refer to other side of the optical path comparatively near a photosensor.

A certain region of an object side surface (or an image side surface) of a lens may be convex or concave. Herein, a convex or concave region is more outwardly convex or inwardly concave in the direction of an optical axis as compared with other neighboring regions of the object/image side surface.

Figure 1:
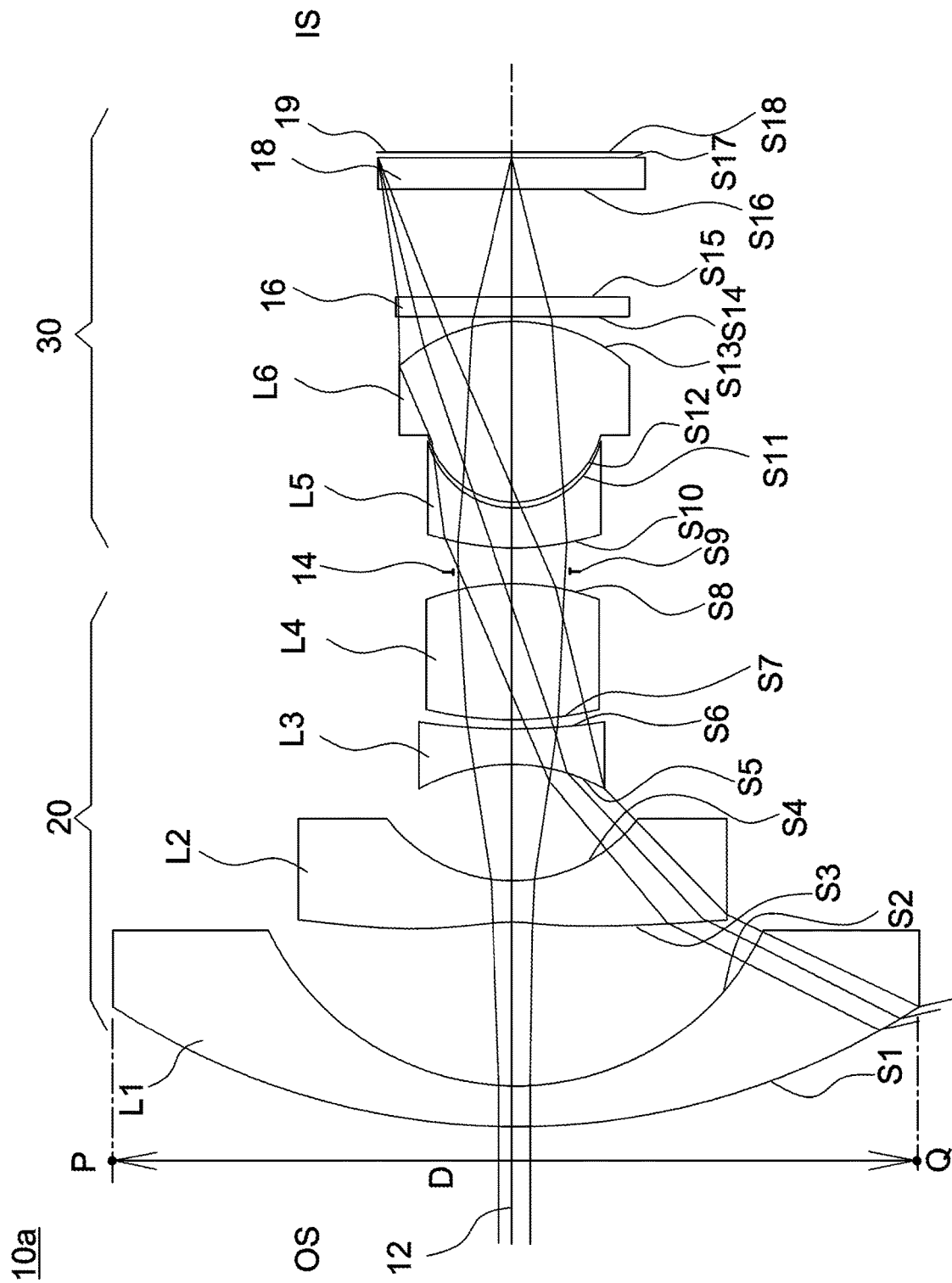
FIG. 1 shows a cross-sectional illustration of an optical lens according to an embodiment of the invention.
Figure 2:
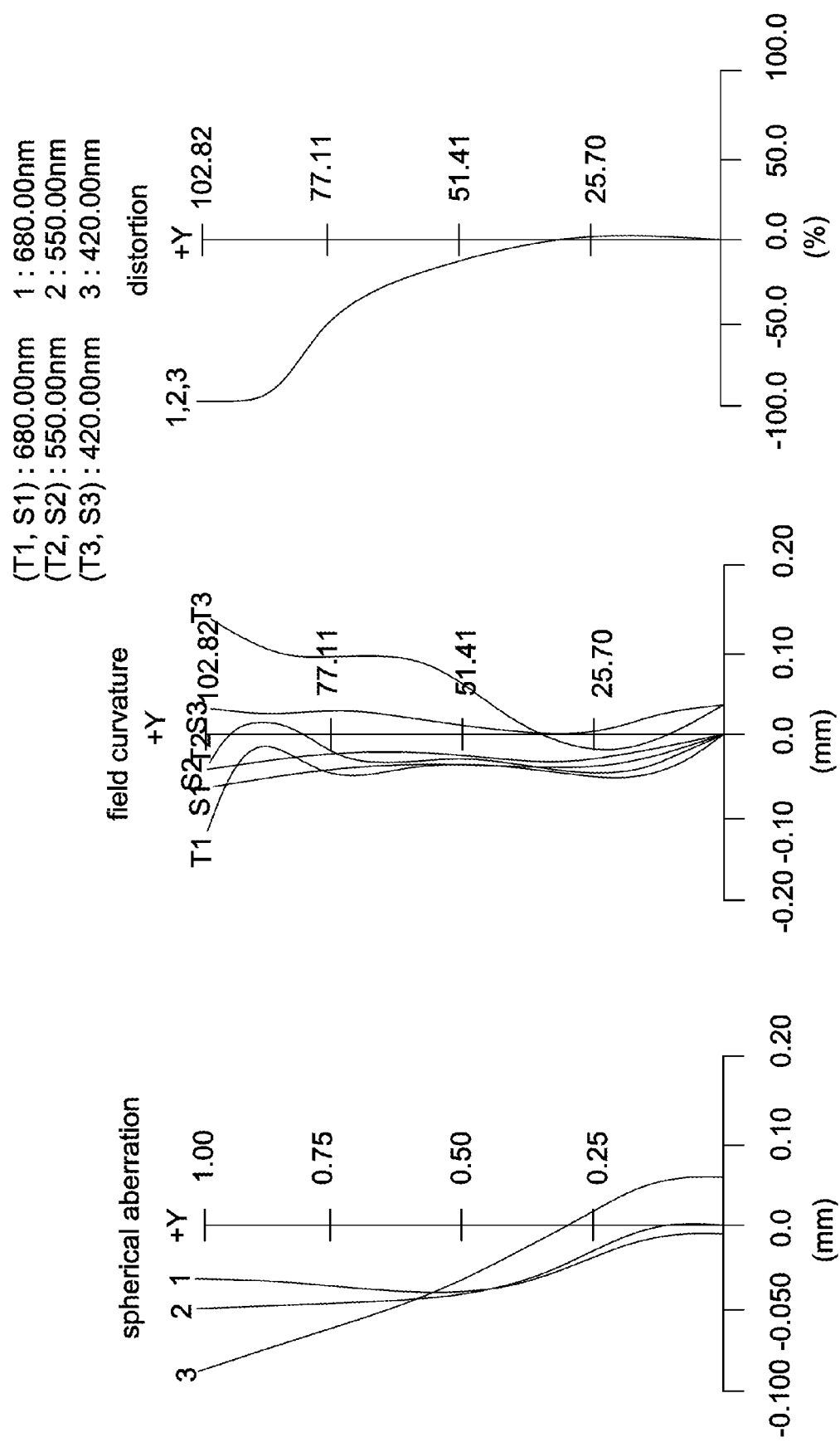
FIG. 2 illustrates spherical aberration, field curvature and distortion plots of the optical lens shown in FIG. 1.

FIG. 1 shows a cross-sectional illustration of an optical lens according to an embodiment of the invention. As shown in FIG. 1, in this embodiment, the optical lens 10a has a lens barrel (not shown), and inside the lens barrel a first lens L1, a second lens L2, a third lens L3, a fourth lens L4, an aperture stop 14, a fifth lens L5 and a sixth lens L6 are arranged in order from a first side (magnified side OS) to a second side (minified side IS). The first lens L1, the second lens L2, the third lens L3 and the fourth lens L4 form a first lens group 20 (such as a front lens group) with a negative refractive power, and the fifth lens L5 and the sixth lens L6 form a second lens group 30 (such as a rear lens group) with a positive refractive power.

Further, the minified side IS may be disposed with an IR (infrared) filter 16, a cover glass 18, and a photosensor (not shown), an image plane of the optical lens 10a formed at an effective focal length for visible light is labeled as 19, and the IR filter 16 and the cover glass 18 are disposed between the second lens group 30 and the image plane 19 for visible light.

In this embodiment, the refractive powers of the first lens L1 to the sixth lens L6 are negative, negative, negative, positive, negative and positive, and the second lens L2, the third lens L3, the fifth lens L5 and the sixth lens L6 are aspheric plastic lenses. In other embodiment, the aspheric plastic lenses can be replaced with aspheric glass lenses.

In one embodiment, adjoining surfaces of each two adjacent lenses may have a similar radius of curvature (a radius difference of smaller than 0.005 mm), a substantially identical radius of curvature or an exactly identical radius of curvature, and adjacent lenses may be fit together to form a compound lens, such as a cemented lens, a doublet lens or a triplet lens. For example, in one embodiment, the fifth lens L5 and the sixth lens L6 are fit together to form a cemented lens having an adhesive layer of 0.008 mm in thickness interposed between two aspheric joint surfaces respectively on the fifth lens L5 and the sixth lens L6, but the invention is not limited thereto.

Further, in one embodiment, the fourth lens L4 may be combined with other lens element to form a cemented doublet or a cemented triplet, and a total number of lenses with refractive powers is eight, but the invention is not limited thereto. In each of the following embodiments, the magnified side OS is located on the left side and the minified side IS is located on the right side of each figure, and thus this is not repeatedly described in the following for brevity.

The aperture stop 14 may be an independent component or integrally formed with other optical element. In this embodiment, the aperture stop may use a mechanic piece to block out peripheral light and transmit central light to achieve aperture effects. The mechanic piece may be adjusted by varying its position, shape or transmittance. In other embodiment, the aperture stop may be formed by applying an opaque or a light-absorbing material on a lens surface except for a central area to block out peripheral light and transmits central light.

A lens surface of each lens may be assigned a parameter of "diameter". The diameter of a lens surface is a distance between opposite turning points P and Q measured in a direction perpendicular to the optical axis 12, such as a diameter D of the lens L1 shown in FIG. 1. In this embodiment, D1 is a diameter of a lens surface S1 of the first lens group 20 furthest from the second lens group 30, DL is a diameter of a lens surface S13 of the second lens group 30 furthest from the first lens group 20, a diameter D1 of the lens surface S1 is 12.06 mm, and a diameter DL of the lens surface S13 is 3.274 mm.

Detailed optical data and design parameters of the optical lens 10a are shown in Tables 1 and 2 below. In the following design examples of the invention, each aspheric surface satisfies the following equation:

$$Z = \frac{cr^2}{1+\sqrt{1+(1+k)c^2r^2}} + AR1r + AR2r^2 + AR3r^3 + \cdots + ARnr^n + AR20r^{20},$$

where Z denotes a sag of an aspheric surface along the optical axis, c denotes a reciprocal of a radius of an osculating sphere, K denotes a Conic constant, r denotes a height of the aspheric surface measured in a direction perpendicular to the optical axis. Table 2 lists $4^{th}$, $6^{th}$, $8^{th}$, $10^{th}$, $12^{th}$, $14^{th}$, $16^{th}$, $18^{th}$ and $20^{th}$ order aspheric coefficients of the optical lens 10a. Note the data provided below are not used for limiting the invention, and those skilled in the art may suitably modify parameters or settings of the following embodiment with reference of the invention without departing from the scope or spirit of the invention.

TABLE 1

F/# = 2.0; EFL = 0.896(mm); TTL = 14.5(mm)
LT = 12.04; FOV = 206 degrees; DL/LT = 0.27
EFL/LT = 0.074; IMH = 1.993(mm)

| surface | radius of curvature (mm) | interval (mm) | refractive index | Abbe number | object description |
|---|---|---|---|---|---|
| S1 | 10.509 | 0.608 | 1.83 | 42.7 | L1(meniscus) |
| S2 | 3.945 | 2.421 | | | |
| S3* | −3.979 | 0.650 | 1.54 | 56.0 | L2(aspheric) |
| S4* | 2.306 | 1.773 | | | |
| S5* | −3.866 | 0.500 | 1.54 | 56.0 | L3(aspheric) |
| S6* | 7.461 | 0.100 | | | |
| S7 | 4.576 | 2.044 | 1.85 | 23.8 | L4(bi-convex) |
| S8 | −4.576 | 0.180 | | | |
| S9 | INF. | 0.383 | | | aperture stop 14 |
| S10* | 2.694 | 0.668 | 1.64 | 23.0 | L5(aspheric) |
| S11* | 0.652 | 0.008 | 1.50 | 56.0 | adhesive |
| S12* | 0.652 | 2.705 | 1.54 | 56.0 | L6(aspheric) |
| S13* | −1.895 | 0.100 | | | |
| S14 | INF. | 0.210 | 1.52 | 64.1 | IR filter 16 |
| S15 | INF. | 1.705 | | | |
| S16 | INF. | 0.400 | 1.52 | 64.1 | cover glass 18 |
| S17 | INF. | 0.045 | | | |
| S18 | | | | | image plane 19 |

TABLE 2

|      | S3*        | S4*        | S5*        | S6*        |
|------|------------|------------|------------|------------|
| k    | −96.062    | −0.295     | −89.878    | −99.000    |
| AR4  | 5.598E−02  | 1.657E−01  | −2.369E−01 | −4.160E−02 |
| AR6  | −3.217E−02 | −1.434E−01 | 2.006E−01  | 8.072E−03  |
| AR8  | 1.074E−02  | 4.676E−02  | −1.510E−01 | 3.941E−02  |
| AR10 | −2.333E−03 | 8.238E−03  | 9.733E−02  | −3.247E−02 |
| AR12 | 3.415E−04  | −1.436E−02 | −4.482E−02 | 7.643E−03  |
| AR14 | −3.337E−05 | 5.958E−03  | 1.188E−02  | 9.810E−04  |
| AR16 | 2.080E−06  | −1.144E−03 | −1.308E−03 | −4.307E−04 |
| AR18 | −7.463E−08 | 8.498E−05  | 0.000E+00  | 0.000E+00  |
| AR20 | 1.169E−09  | 0.000E+00  | 0.000E+00  | 0.000E+00  |

|      | S10*       | S11*       | S12*       | S13*       |
|------|------------|------------|------------|------------|
| k    | −10.129    | −1.272     | −1.272     | −0.290     |
| AR4  | 2.066E−02  | −3.445E−02 | −3.445E−02 | 2.693E−02  |
| AR6  | −3.863E−02 | 7.747E−03  | 7.747E−03  | 1.277E−02  |
| AR8  | 3.778E−02  | 7.685E−03  | 7.685E−03  | −2.200E−02 |
| AR10 | −2.147E−02 | −5.493E−03 | −5.493E−03 | 1.716E−02  |
| AR12 | 5.217E−03  | 1.458E−03  | 1.458E−03  | −7.312E−03 |
| AR14 | 0.000E+00  | 0.000E+00  | 0.000E+00  | 1.661E−03  |
| AR16 | 0.000E+00  | 0.000E+00  | 0.000E+00  | −1.586E−04 |
| AR18 | 0.000E+00  | 0.000E+00  | 0.000E+00  | 0.000E+00  |
| AR20 | 0.000E+00  | 0.000E+00  | 0.000E+00  | 0.000E+00  |

In the above Table 1, the field heading "interval" represents a distance between two adjacent surfaces along the optical axis 12 of the optical lens 10a. For example, an interval of the surface S1 is a distance between the surface S1 and the surface S2 along the optical axis 12, and an interval of the surface S17 is a distance between the surface S17 and the image plane 19 for visible light along the optical axis 12.

In the above table, the surface denoted by an asterisk is an aspheric surface, and a surface without the denotation of an asterisk is a spherical surface.

The radius of curvature is a reciprocal of the curvature. When a lens surface has a positive radius of curvature, the center of the lens surface is located towards the minified side.

When a lens surface has a negative radius of curvature, the center of the lens surface is located towards the magnified side. The concavity and convexity of each lens surface is listed in the above table and shown in corresponding figures.

The Symbol F/# shown in the above table is an aperture value of the aperture stop. When the optical lens is used in an optical projection system, the image plane is provided on a light valve, and, when the optical lens is used in an image pick-up system, the image plane is a sensing surface of a photosensor.

When the optical lens is used in an image pick-up system, the image circle refers to a diagonal length of an image on an image plane, and a semi-diagonal image height IMH listed in the above table equals half of the image circle.

A total lens length of the optical lens 10a is denoted as "LT" in the above table. Specifically, the total lens length LT is a distance along the optical axis 12 between a lens surface S1 closest to the magnified side and a lens surface S13 closest to the minified side (minified-side surface of the lens L6); that is, the total lens length LT is a length measured on the optical axis 12 between two outermost lens surfaces of the optical lens. In one embodiment, the total lens length LT of the optical lens is smaller than 15 mm.

A total track length of the optical lens 10a is denoted as "TTL" in the above table. Specifically, the total track length TTL is a distance along the optical axis 12 between a lens surface S1 closest to the magnified side (furthest from the image plane 19) and the image plane 19.

In this embodiment, FOV denoted in the above table is a light collection angle of the optical surface S1 closest to the magnified side; that is, the FOV is a full field of view measured diagonally. In one embodiment, the FOV is greater than 190 degrees and smaller than 230 degrees.

In one embodiment, the optical lens may include two lens groups, and the front lens group may include two lenses with negative refractive powers to increase light collection efficiency, where one of the two negative lenses is an aspheric lens, but the invention is not limited thereto. In one embodiment, an F-number of the optical lens is larger than or equal to about 1.8. The rear lens group may include at least one compound lens and at least one aspheric lens to correct monochromatic and chromatic aberrations, and thus a minimum distance between two lenses of the rear lens group along an optical axis is no more than 0.01 mm. The compound lens may be a cemented lens, a doublet lens, a triplet lens or even higher number lens configurations, and adjoining surfaces of each two adjacent lenses of the compound lens may have an identical or a similar radius of curvature. In one embodiment, a total number of lenses with refractive power in the optical lens is 5-8 (less than 9). In one embodiment, the optical lens may have three lenses with an Abbe number of greater than 50, and the three lenses may be made from plastic. In other embodiment, the optical lens may have three lenses with an Abbe number of greater than 55, and the rear lens group may have a cemented lens including at least one lens with an Abbe number of greater than 50.

In one embodiment, the optical lens may satisfy a condition of 0.2<DL/LT<0.38, a further condition of 0.21<DL/LT<0.36, and a still further condition of 0.22<DL/LT<0.34, where DL is a diameter of a lens surface closest to the image plane (a lens surface of the second lens group furthest from the first lens group), LT is a distance along the optical axis between a lens surface closest to the magnified side and a lens surface closest to the minified side. Meeting the above conditions may facilitate light converging capability of lenses to reduce the scope of image beams passing through lenses to match the size of a photosensor and thus allow for better optical performance in a limited space.

In one embodiment, the optical lens may satisfy a condition of 0.05<EFL/LT<0.1, a further condition of 0.054<EFL/LT<0.098, and a still further condition of 0.058<EFL/LT<0.096, where EFL is an effective focal length of the optical lens, and LT is a length measured on the optical axis between two outermost lens surfaces of the optical lens. Note that this criterion allows for an optimized proportion of a photosensor to a total lens length LT; that is, providing a proportionally longer LT when using a larger photosensor and a proportionally shorter LT when using a smaller photosensor.

Figure 3:
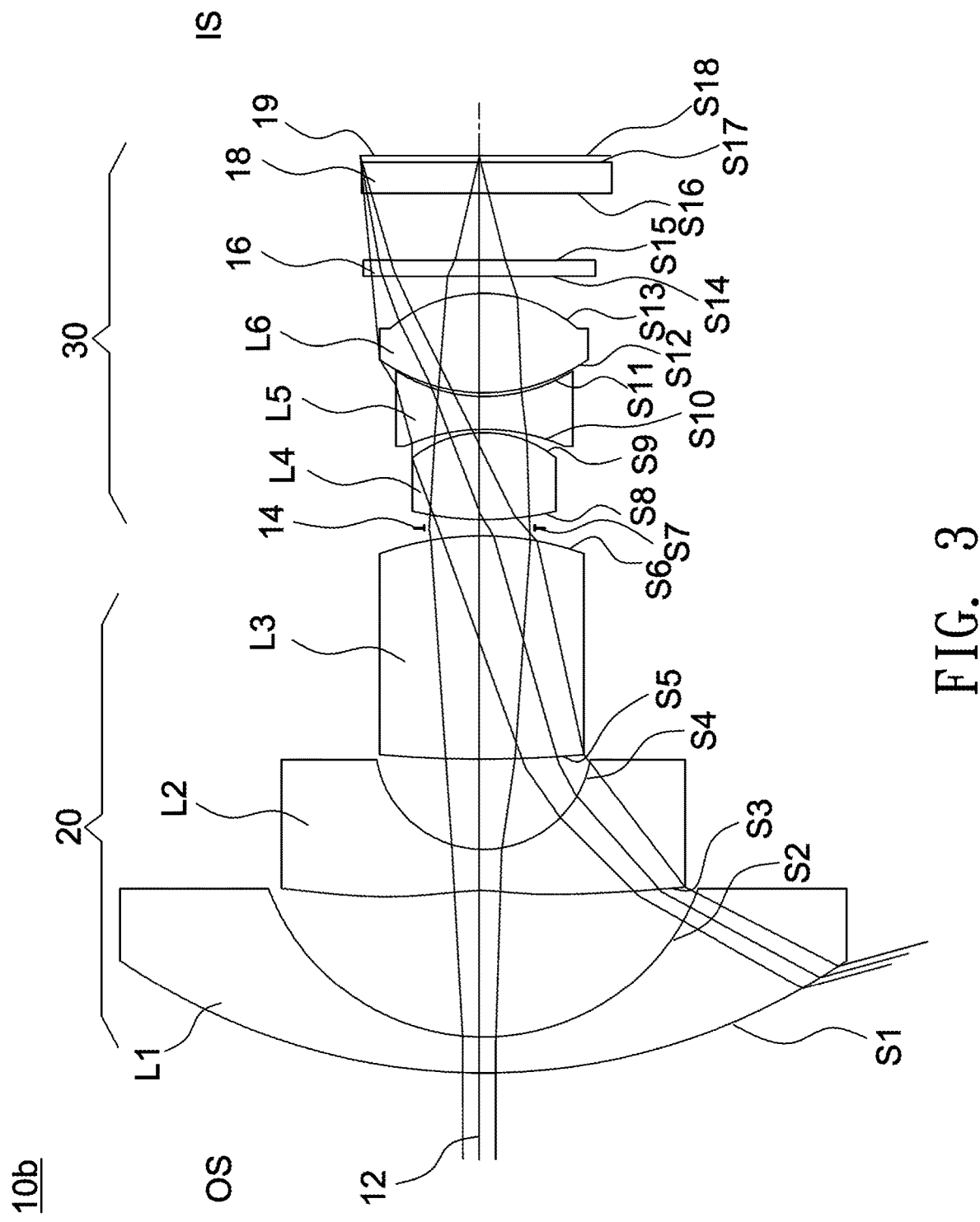
FIG. 3 shows a cross-sectional illustration of another optical lens according to an embodiment of the invention.
Figure 4:
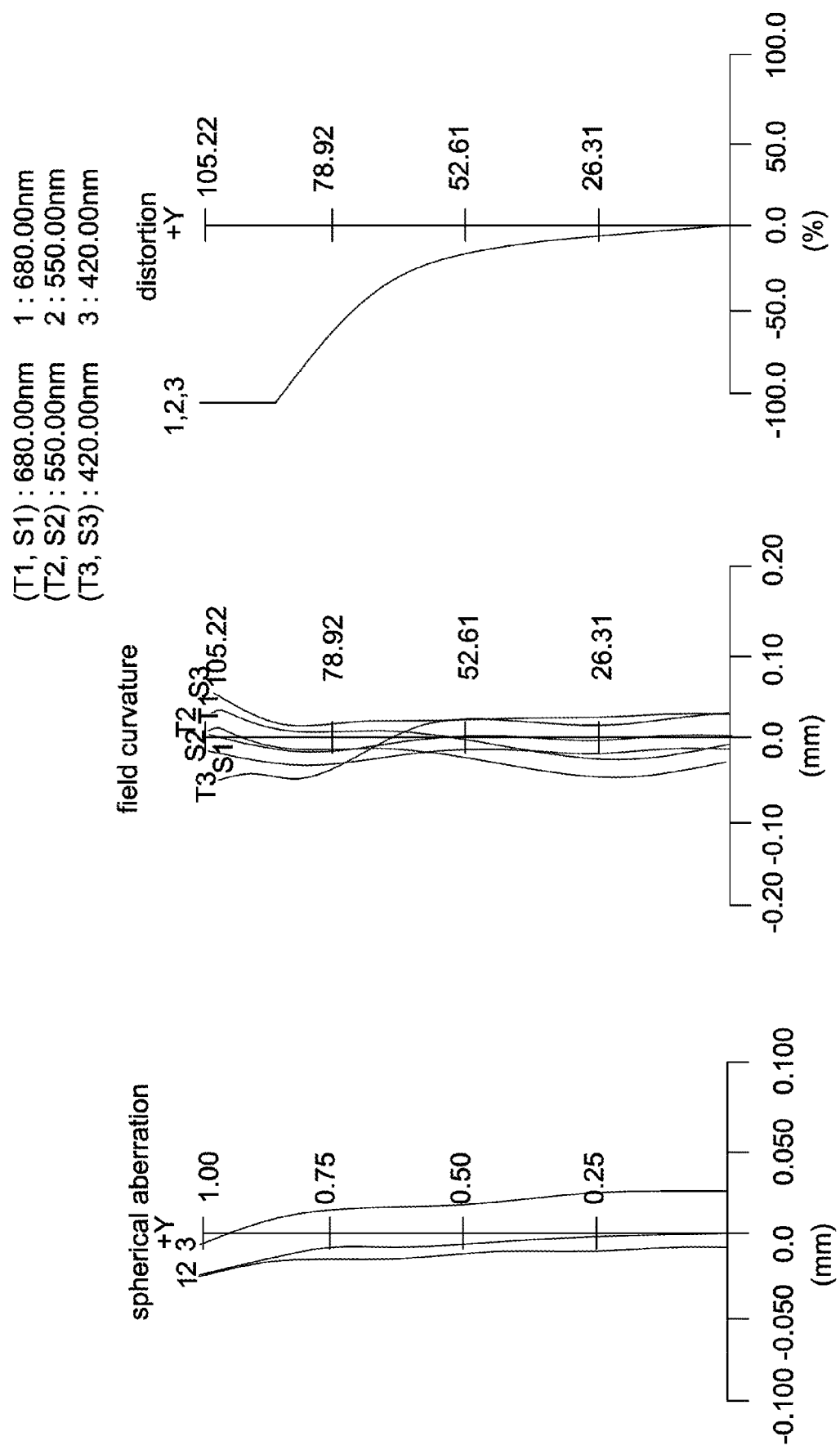
FIG. 4 illustrates spherical aberration, field curvature and distortion plots of the optical lens shown in FIG. 3.

FIG. 3 shows a cross-sectional illustration of an optical lens according to a second embodiment of the invention. The optical lens 10b shown in FIG. 3 includes a first lens L1, a second lens L2, a third lens L3, an aperture stop 14, a fourth lens L4, a fifth lens L5 and a sixth lens L6. The first lens L1, the second lens L2, and the third lens L3 form a first lens group 20 (such as a front lens group) with a negative refractive power, and the fourth lens L4, the fifth lens L5 and the sixth lens L6 form a second lens group 30 (such as a rear lens group) with a positive refractive power.

In this embodiment, the refractive powers of the first lens L1 to the sixth lens L6 are negative, negative, positive, positive, negative and positive, and the second lens L2, the fourth lens L4, the fifth lens L5 and the sixth lens L6 are aspheric lenses made from plastic or glass. Further, in this embodiment, the diameter D1 of the surface S1 is 11.36 mm, and the diameter DL of the surface S13 is 3.276 mm. Detailed optical data and design parameters of the optical lens 10b are shown in Table 3 below.

TABLE 3

F/# = 2.0; EFL = 0.811(mm); TTL = 14.5(mm)
LT = 12.348; FOV = 210 degrees; DL/LT = 0.27
EFL/LT = 0.066; IMH = 2.015(mm)

| surface | radius of curvature (mm) | interval (mm) | refractive index | Abbe number | object description |
|---|---|---|---|---|---|
| S1 | 10.126 | 0.568 | 1.87 | 40.7 | L1(meniscus) |
| S2 | 3.694 | 2.001 | | | |
| S3* | −5.636 | 0.949 | 1.54 | 56.0 | L2(aspheric) |
| S4* | 1.802 | 1.392 | | | |
| S5 | 53.543 | 3.495 | 1.95 | 18.0 | L3(bi-convex) |
| S6 | −5.738 | 0.103 | | | |
| S7 | INF. | 0.315 | | | aperture stop 14 |
| S8* | 4.651 | 1.331 | 1.54 | 56.0 | L4(aspheric) |
| S9* | −1.491 | 0.030 | | | |
| S10* | −3.246 | 0.500 | 1.66 | 20.4 | L5(aspheric) |
| S11* | 1.850 | 0.105 | | | |
| S12* | 2.156 | 1.559 | 1.54 | 56.0 | L6(aspheric) |
| S13* | −1.898 | 0.292 | | | |
| S14 | INF. | 0.210 | 1.52 | 64.1 | IR filter 16 |
| S15 | INF. | 1.205 | | | |
| S16 | INF. | 0.400 | 1.52 | 64.1 | cover glass 18 |
| S17 | INF. | 0.045 | | | |
| S18 | | | | | image plane 19 |

Table 4 lists aspheric coefficients and conic constant of each aspheric surface of the optical lens 10b according to the second embodiment of the invention.

TABLE 4

| | S3* | S4* | S8* | S9* |
|---|---|---|---|---|
| k | 0.000 | 0.000 | 0.000 | 0.000 |
| AR4 | 8.584E−02 | 5.212E−02 | −2.352E−02 | 5.114E−02 |
| AR6 | −2.261E−02 | 1.781E−01 | −2.671E−02 | −4.579E−02 |
| AR8 | 3.231E−03 | −2.209E−01 | 1.620E−02 | 3.668E−02 |
| AR10 | −2.663E−04 | 1.069E−01 | −1.254E−02 | −7.438E−03 |
| AR12 | 1.183E−05 | −2.466E−02 | 0.000E+00 | 0.000E+00 |
| ARM | −2.174E−07 | 2.177E−03 | 0.000E+00 | 0.000E+00 |
| AR16 | 0.000E+00 | 0.000E+00 | 0.000E+00 | 0.000E+00 |
| AR18 | 0.000E+00 | 0.000E+00 | 0.000E+00 | 0.000E+00 |
| AR20 | 0.000E+00 | 0.000E+00 | 0.000E+00 | 0.000E+00 |
| | S10* | S11* | S12* | S13* |
| k | 0.000 | 0.000 | 0.000 | 0.000 |
| AR4 | −3.813E−02 | −1.155E−01 | −7.486E−02 | 2.818E−02 |
| AR6 | −7.042E−03 | 4.785E−02 | 8.536E−03 | 1.053E−02 |
| AR8 | 1.614E−02 | −1.552E−02 | 7.646E−03 | −1.848E−02 |
| AR10 | −3.050E−03 | 1.322E−03 | −3.287E−03 | 1.350E−02 |
| AR12 | 0.000E+00 | 0.000E+00 | 4.431E−04 | −4.489E−03 |
| AR14 | 0.000E+00 | 0.000E+00 | 0.000E+00 | 7.129E−04 |
| AR16 | 0.000E+00 | 0.000E+00 | 0.000E+00 | 0.000E+00 |
| AR18 | 0.000E+00 | 0.000E+00 | 0.000E+00 | 0.000E+00 |
| AR20 | 0.000E+00 | 0.000E+00 | 0.000E+00 | 0.000E+00 |

In the above Table 3, an interval of the surface S1 is a distance between the surface S1 and the surface S2 along the optical axis 12, an interval of the surface S2 is a distance between the surface S2 and the surface S3 along the optical axis 12, and an interval of the surface S17 is a distance between the surface S17 and the image plane 19 for visible light along the optical axis 12. The optical lens 10b may have three plastic lenses with an Abbe number of greater than 50.

Figure 5:
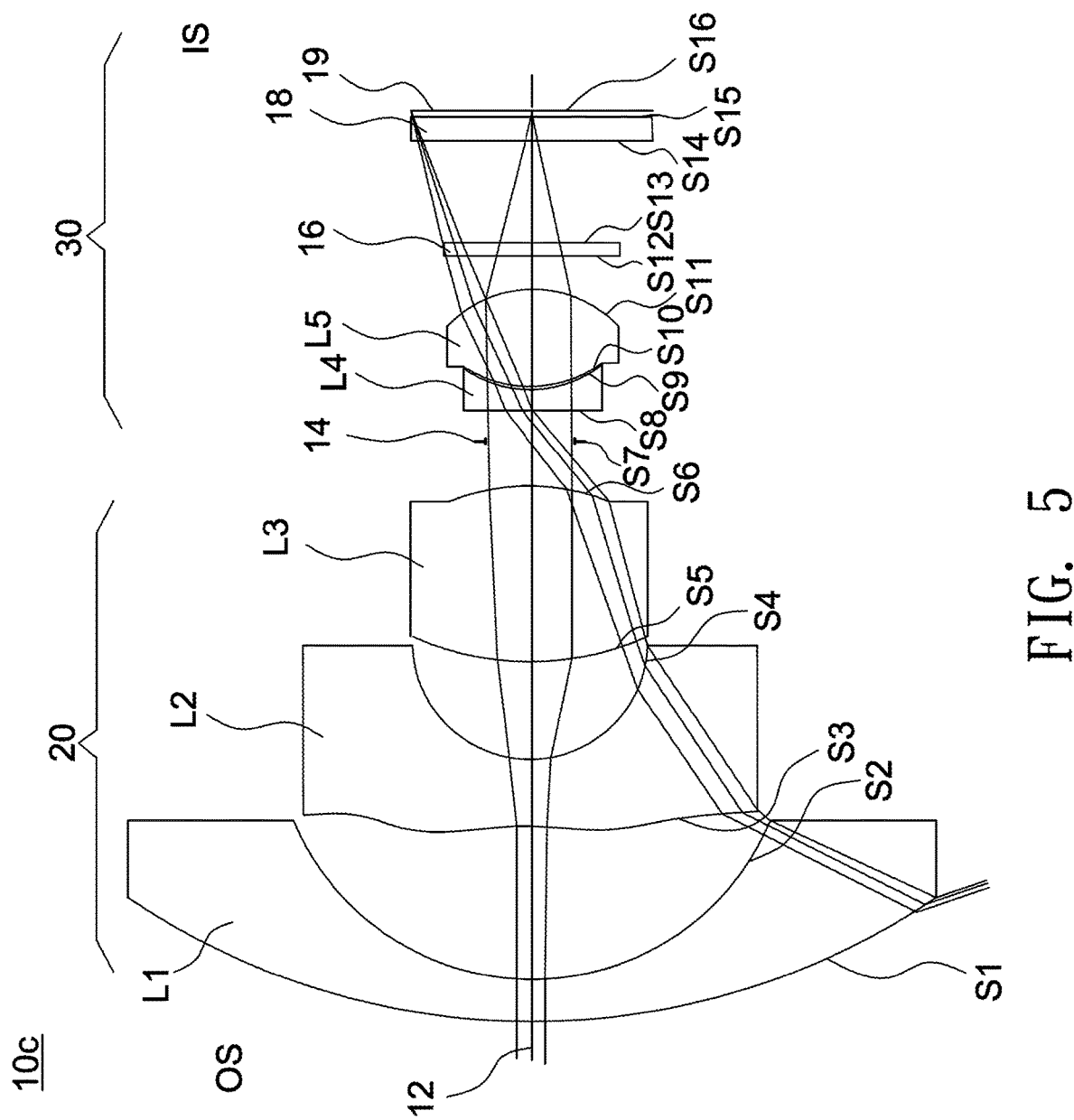
FIG. 5 shows a cross-sectional illustration of another optical lens according to an embodiment of the invention.
Figure 6:
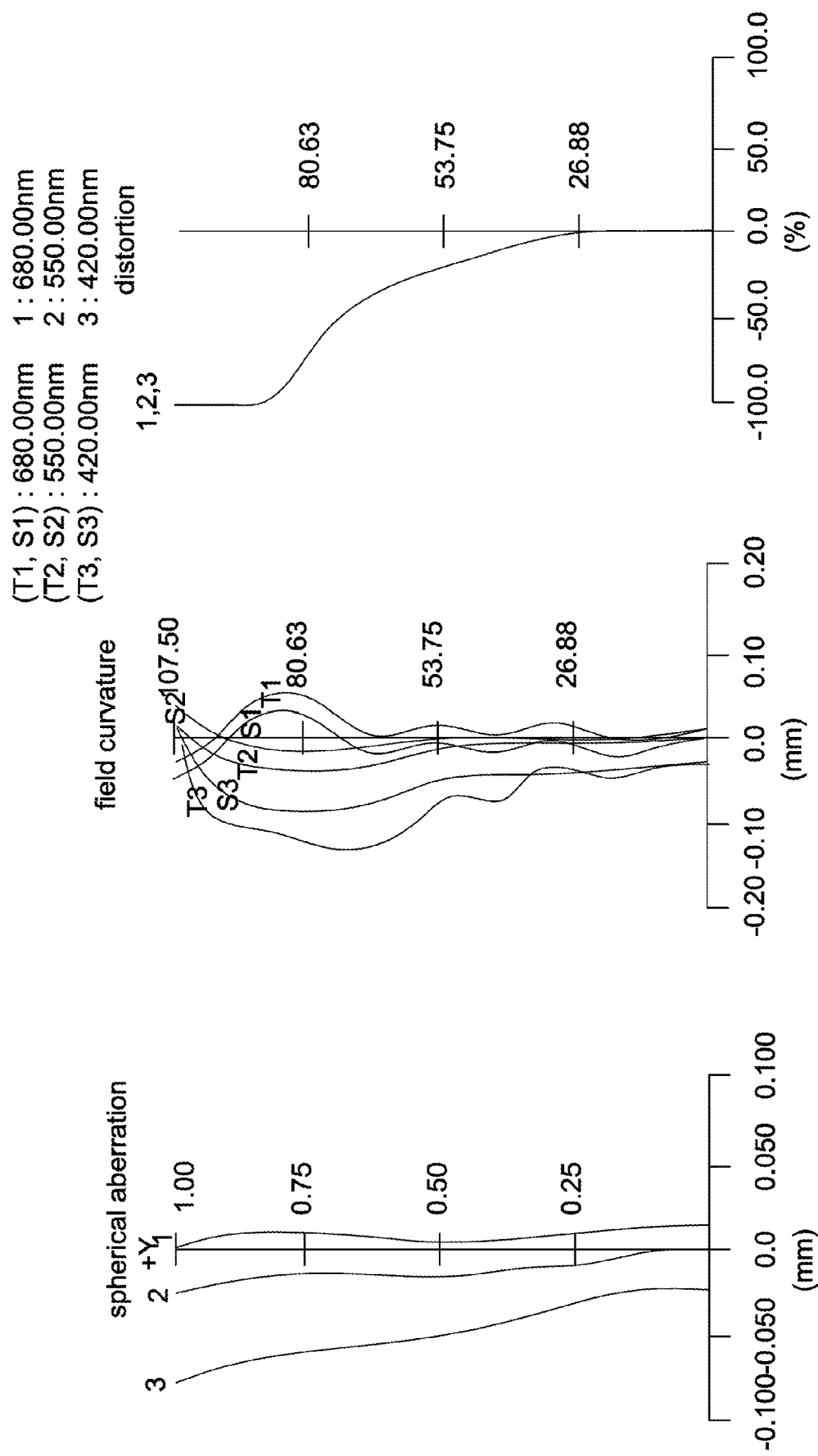
FIG. 6 illustrates spherical aberration, field curvature and distortion plots of the optical lens shown in FIG. 5.
Figure 7:
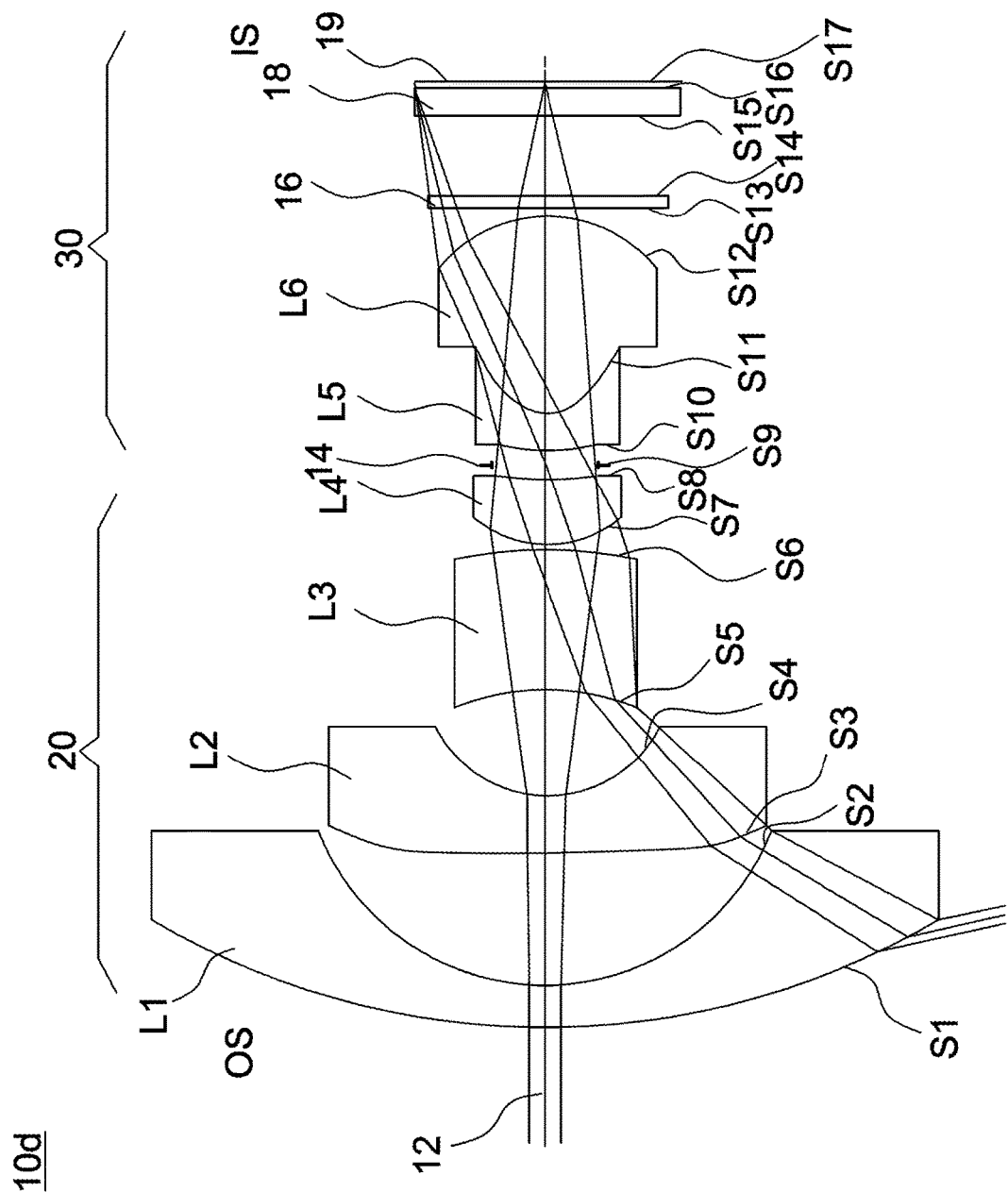
FIG. 7 shows a cross-sectional illustration of another optical lens according to an embodiment of the invention.
Figure 8:
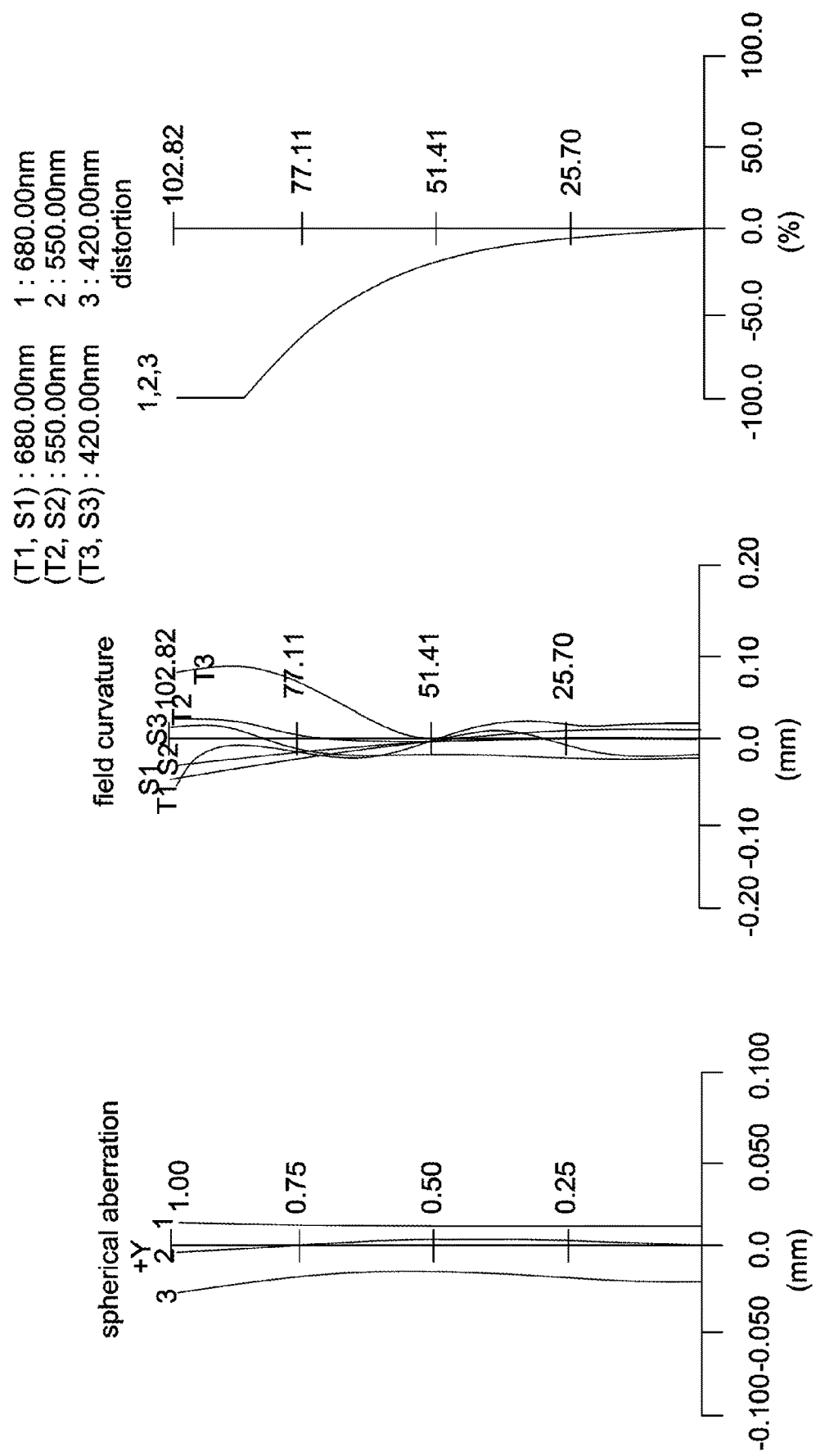
FIG. 8 illustrates spherical aberration, field curvature and distortion plots of the optical lens shown in FIG. 7.
Figure 9:
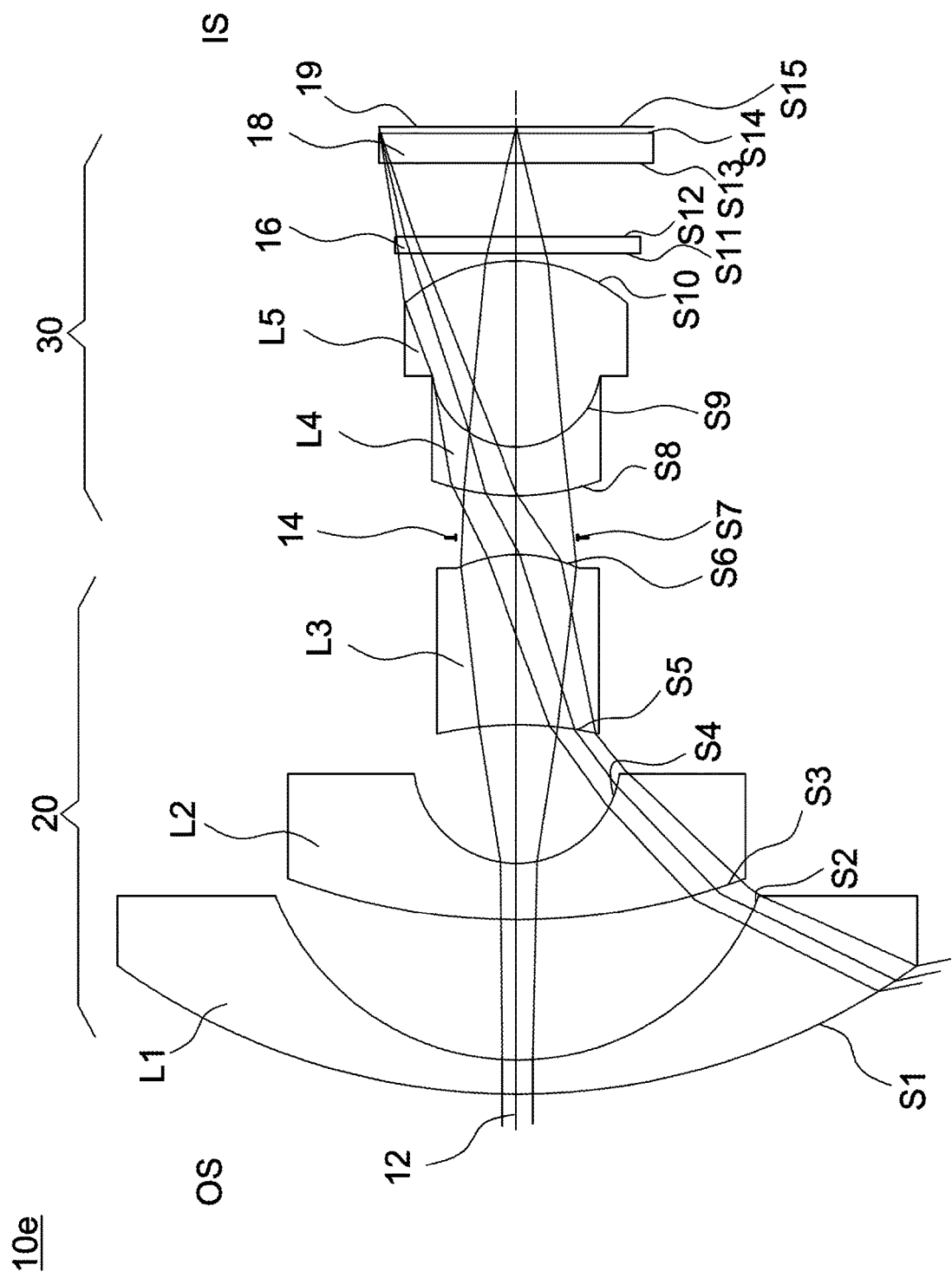
FIG. 9 shows a cross-sectional illustration of another optical lens according to an embodiment of the invention.
Figure 10:
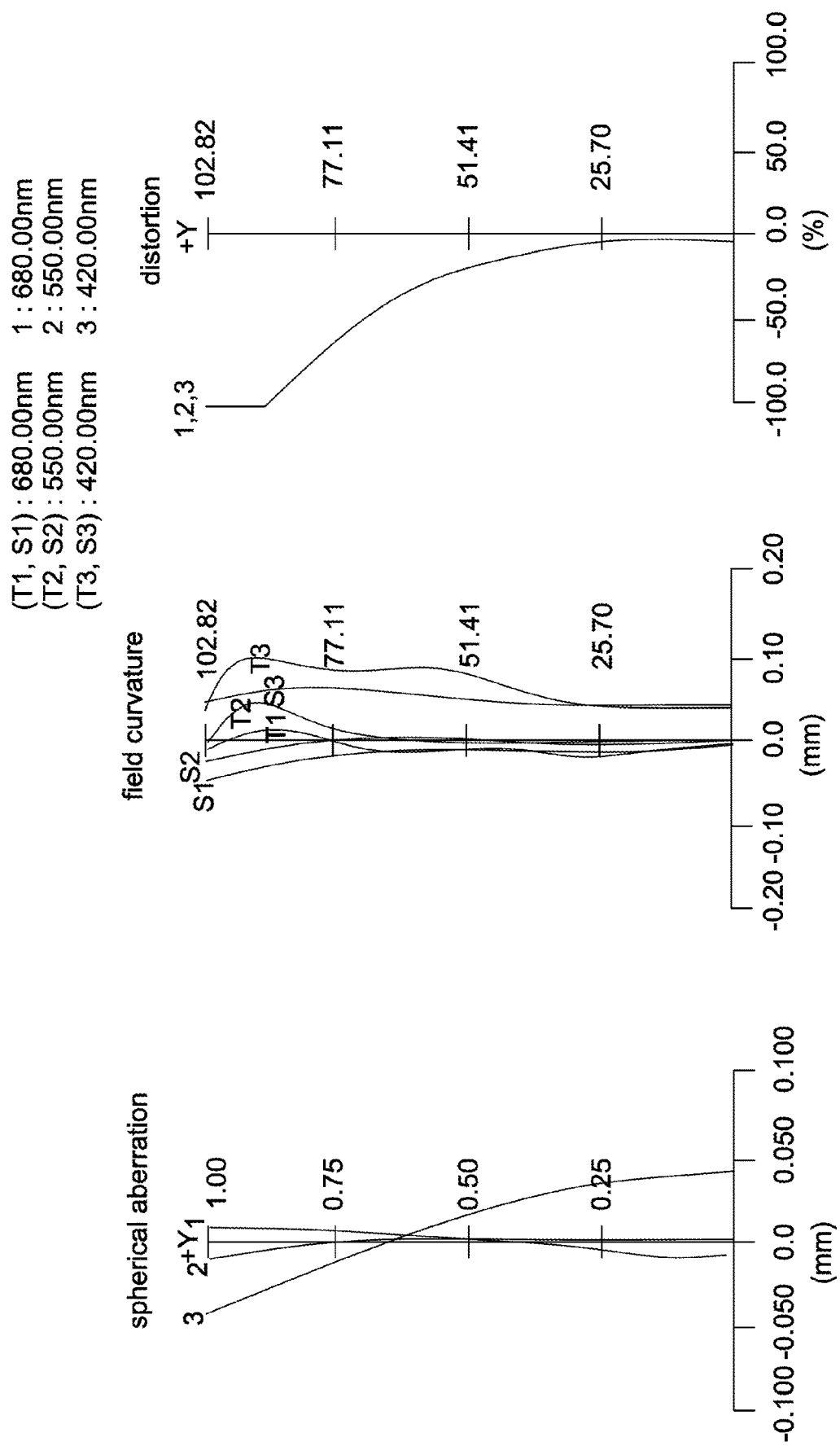
FIG. 10 illustrates spherical aberration, field curvature and distortion plots of the optical lens shown in FIG. 9.
Figure 11:
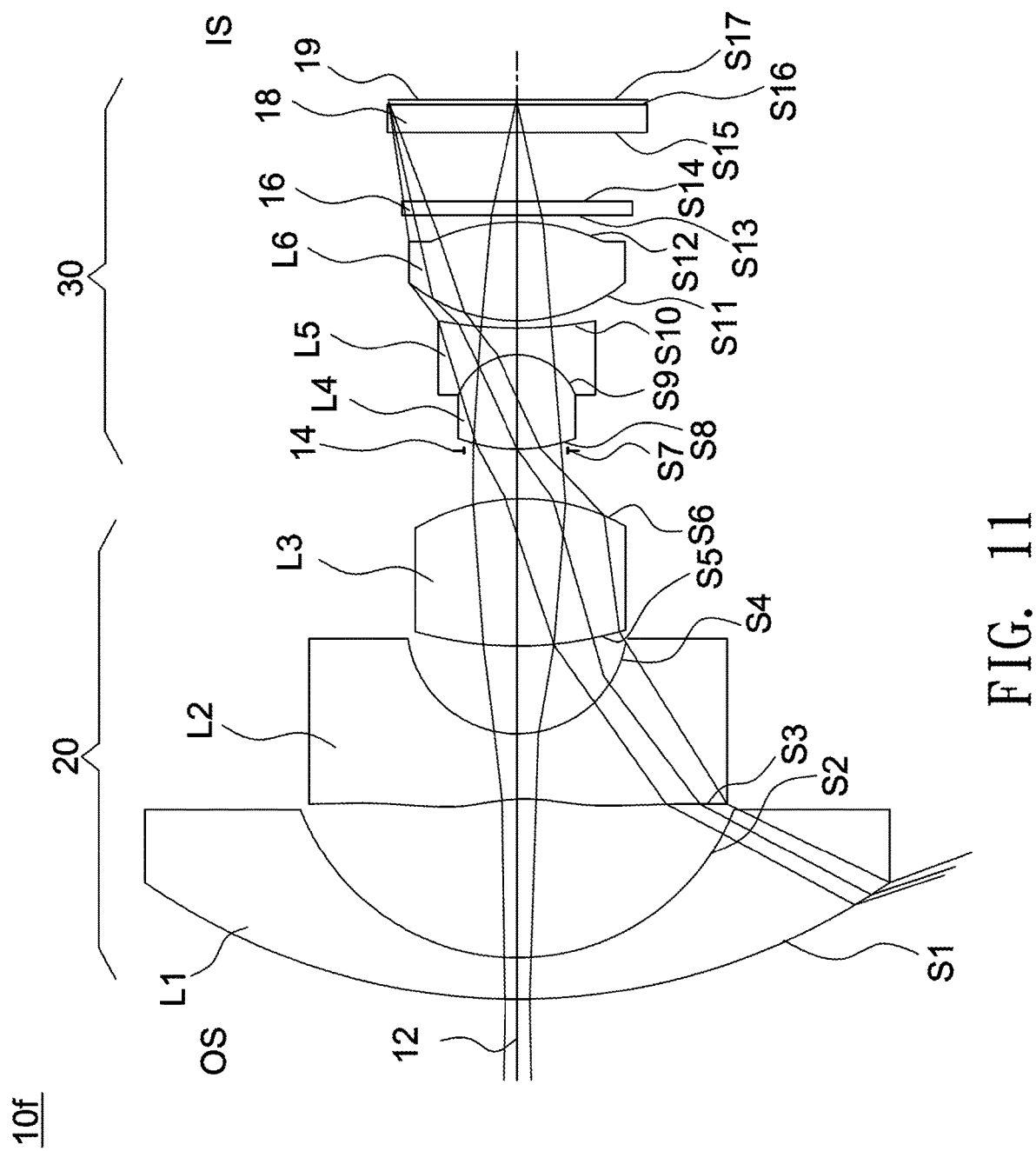
FIG. 11 shows a cross-sectional illustration of another optical lens according to an embodiment of the invention.
Figure 12:
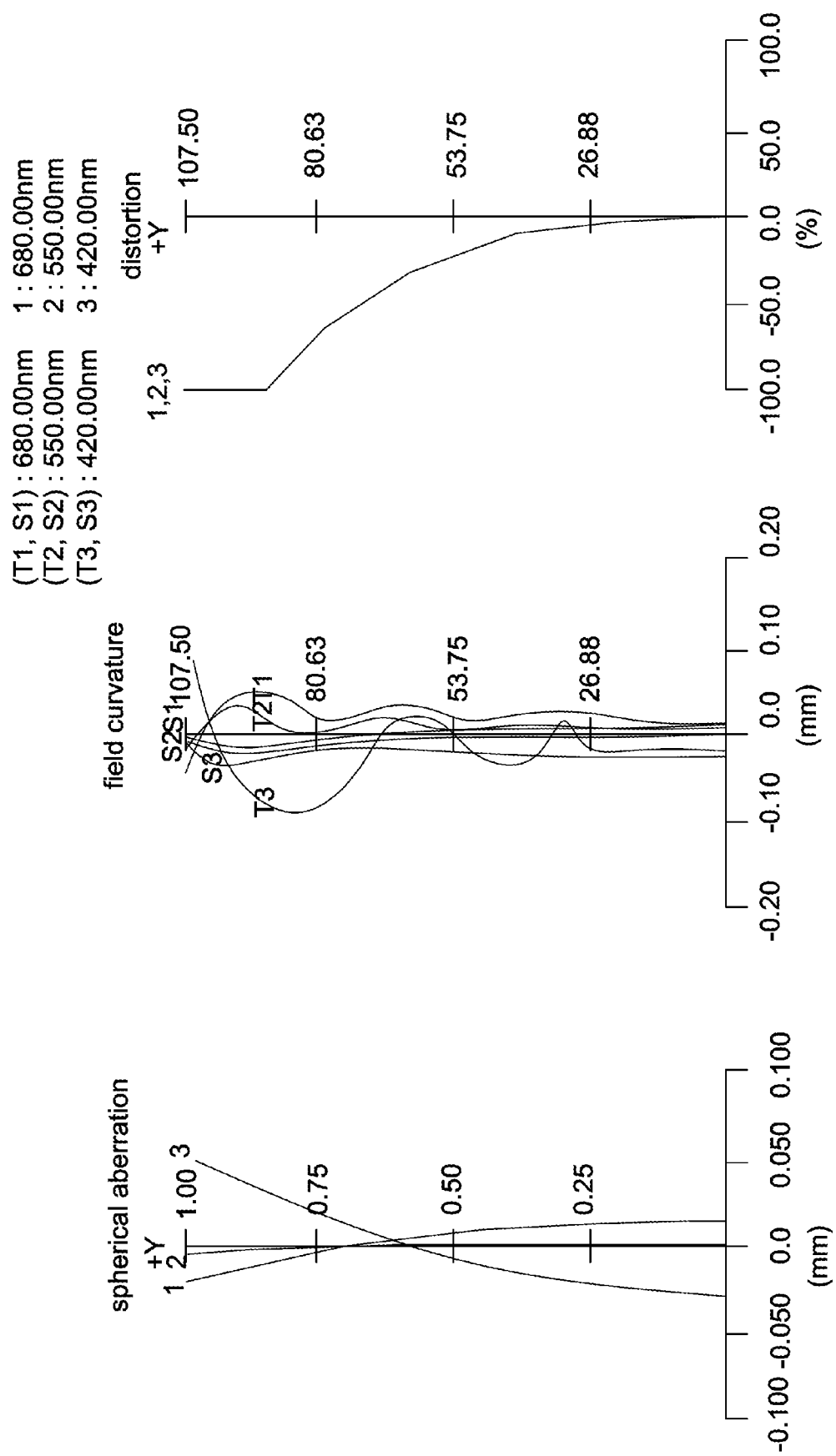
FIG. 12 illustrates spherical aberration, field curvature and distortion plots of the optical lens shown in FIG. 11.
Figure 13:
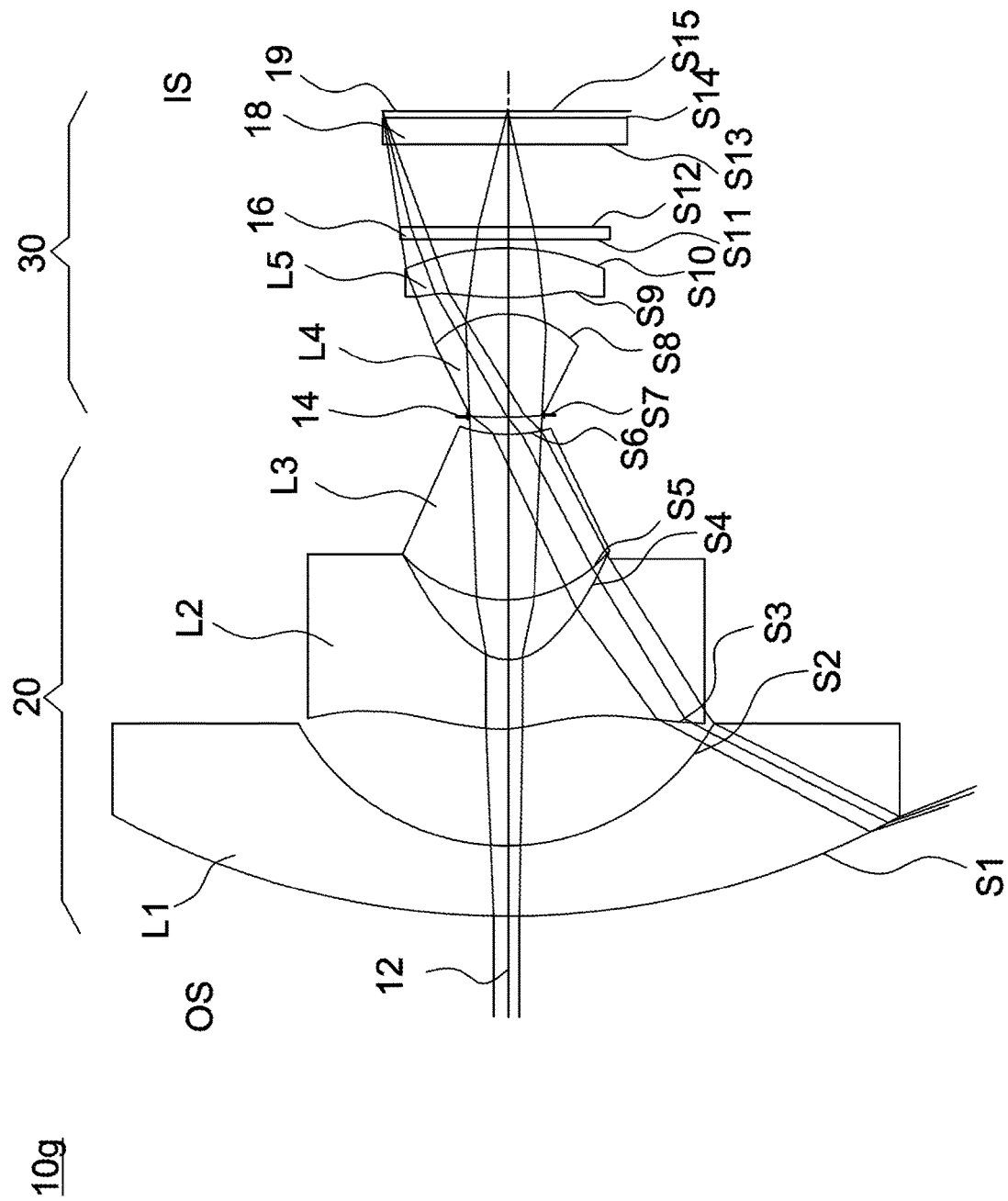
FIG. 13 shows a cross-sectional illustration of another optical lens according to an embodiment of the invention.
Figure 14:
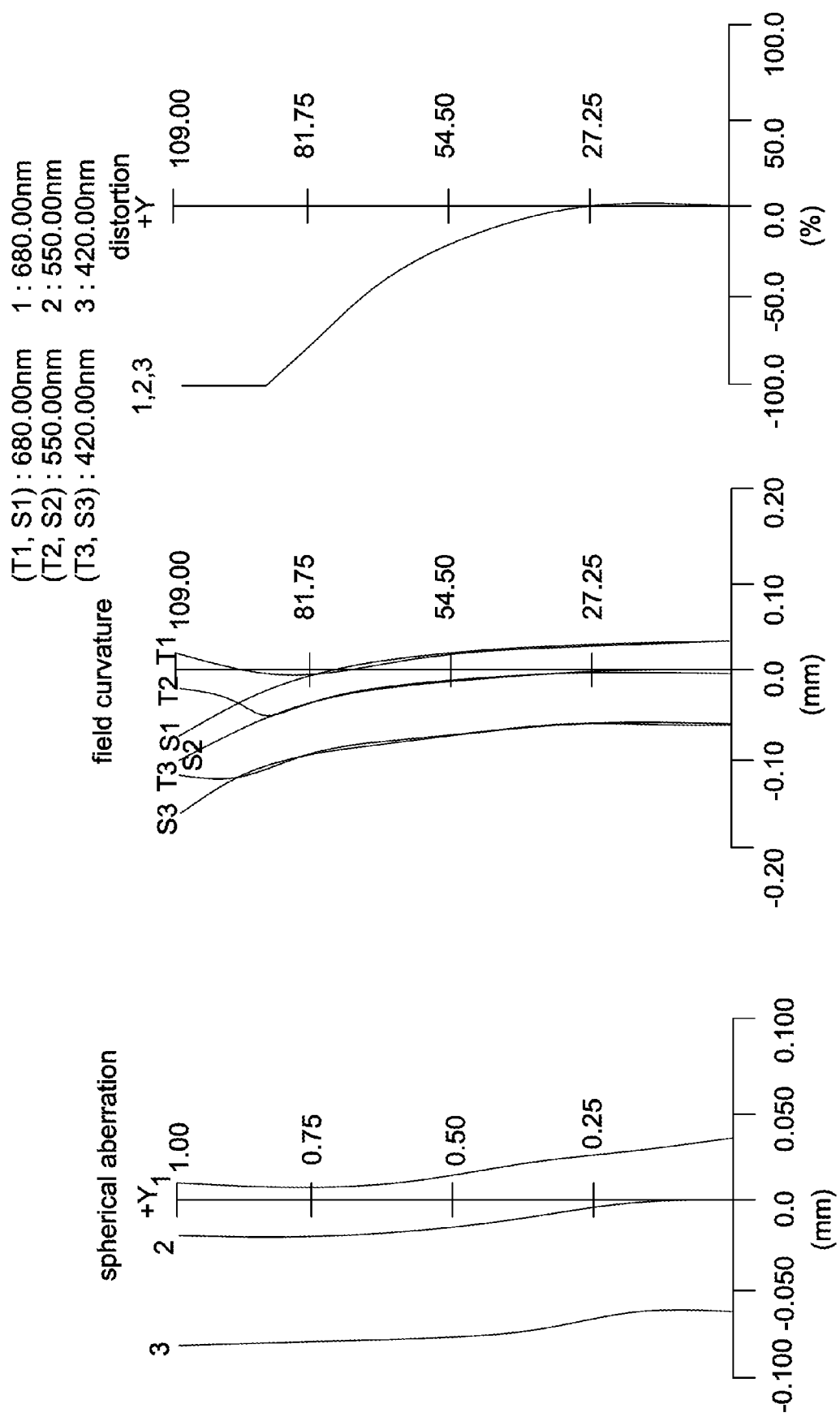
FIG. 14 illustrates spherical aberration, field curvature and distortion plots of the optical lens shown in FIG. 13.
Figure 15:
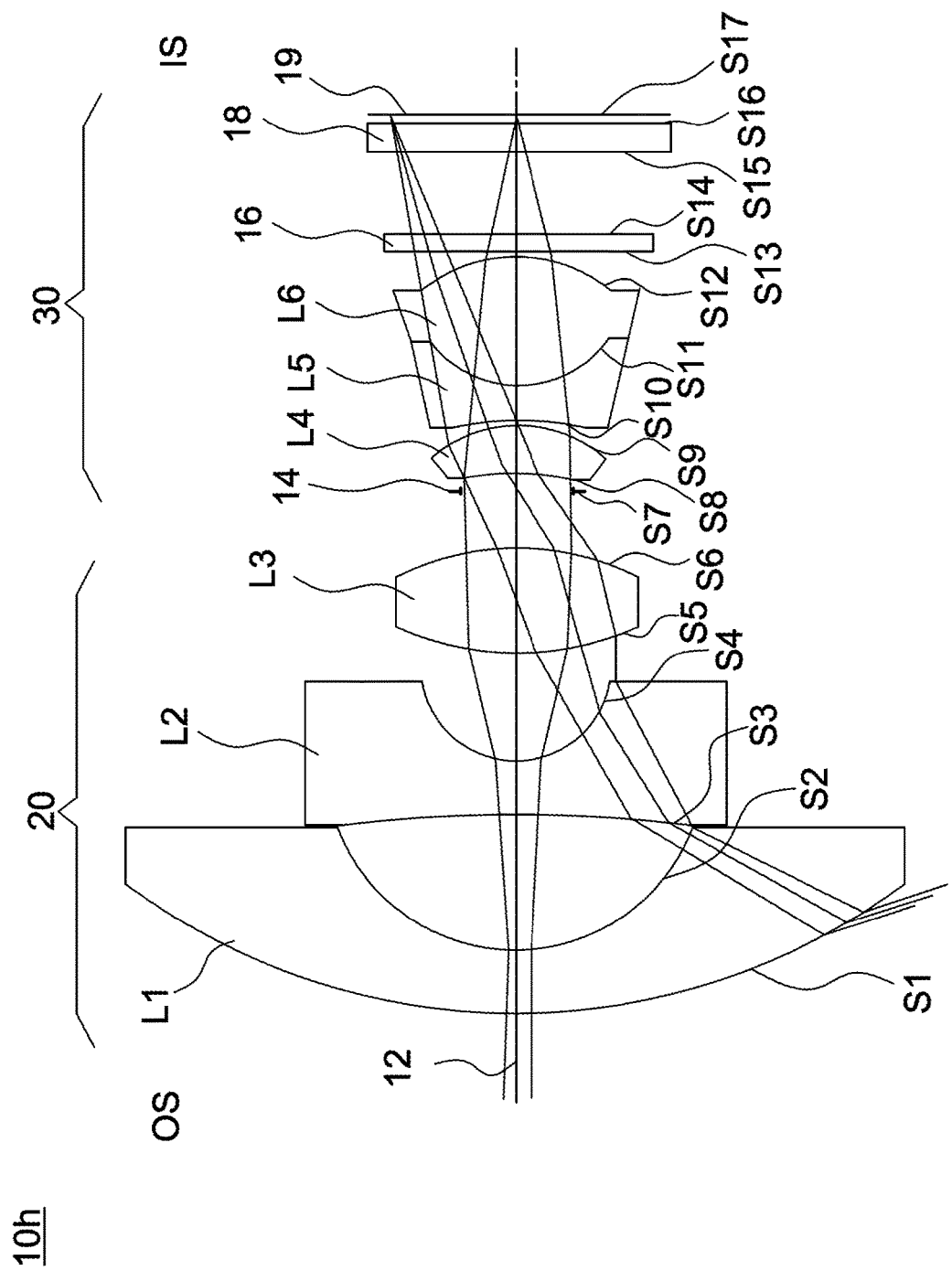
FIG. 15 shows a cross-sectional illustration of another optical lens according to an embodiment of the invention.
Figure 16:
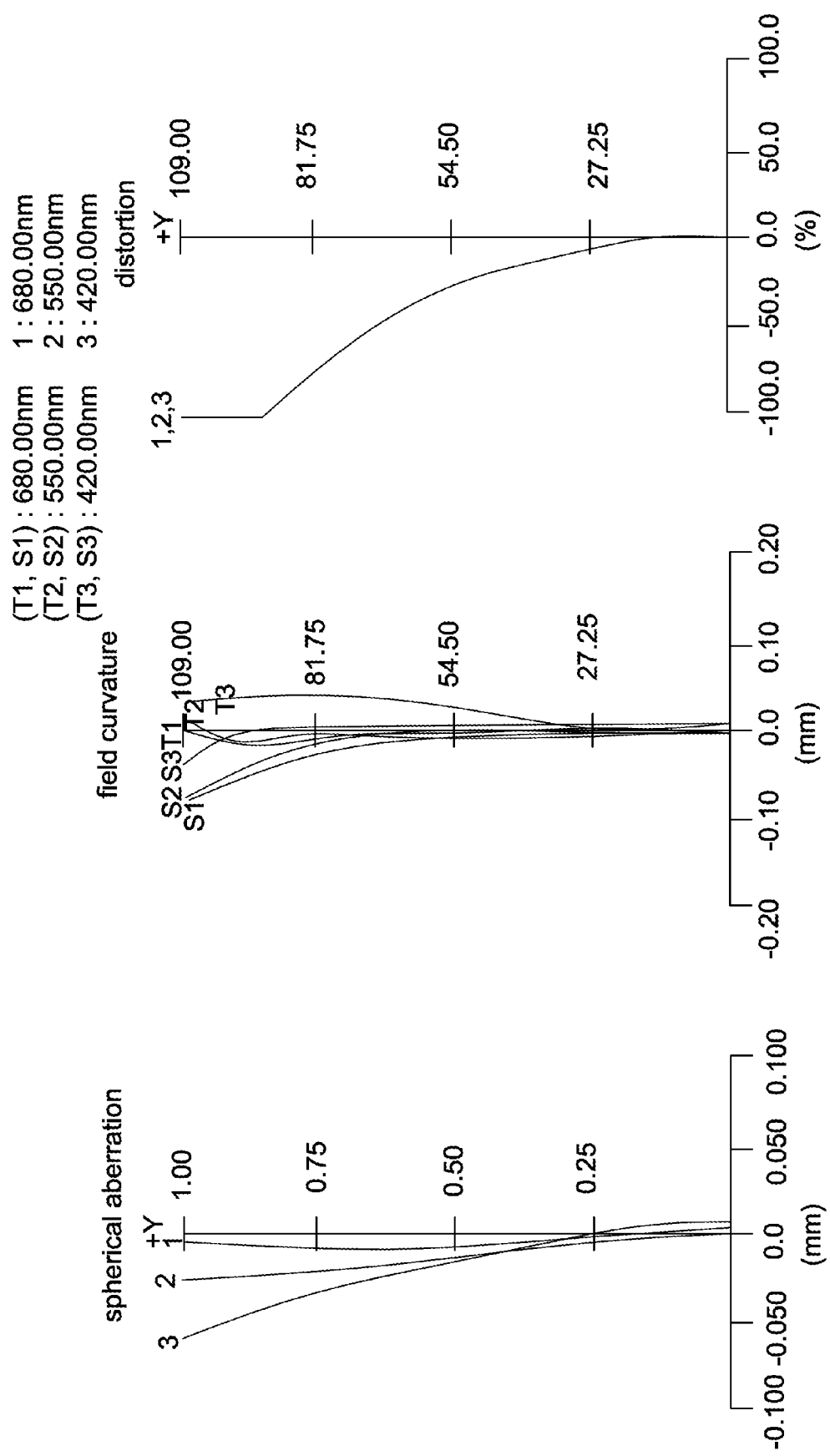
FIG. 16 illustrates spherical aberration, field curvature and distortion plots of the optical lens shown in FIG. 15.
Figure 17:
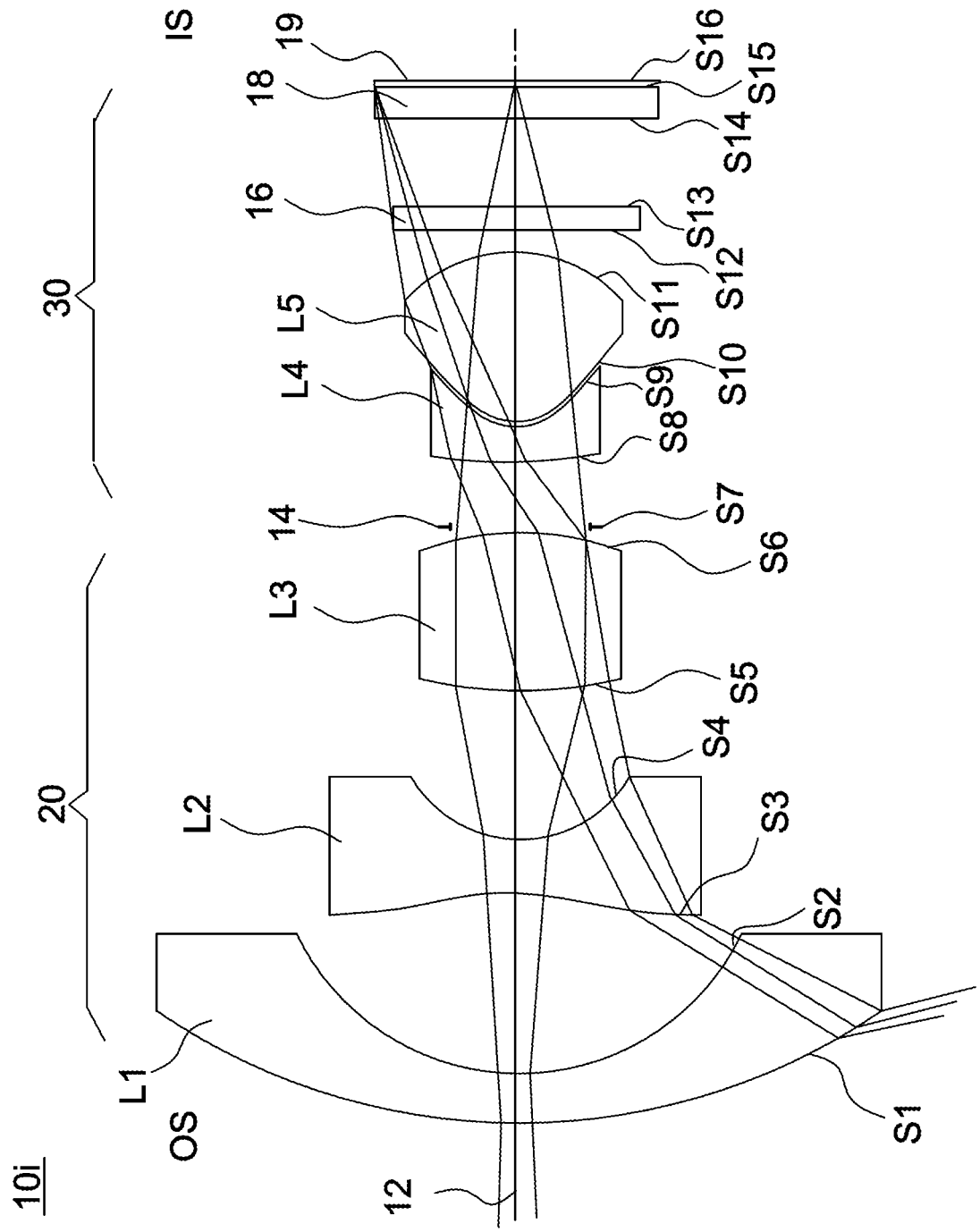
FIG. 17 shows a cross-sectional illustration of another optical lens according to an embodiment of the invention.
Figure 18:
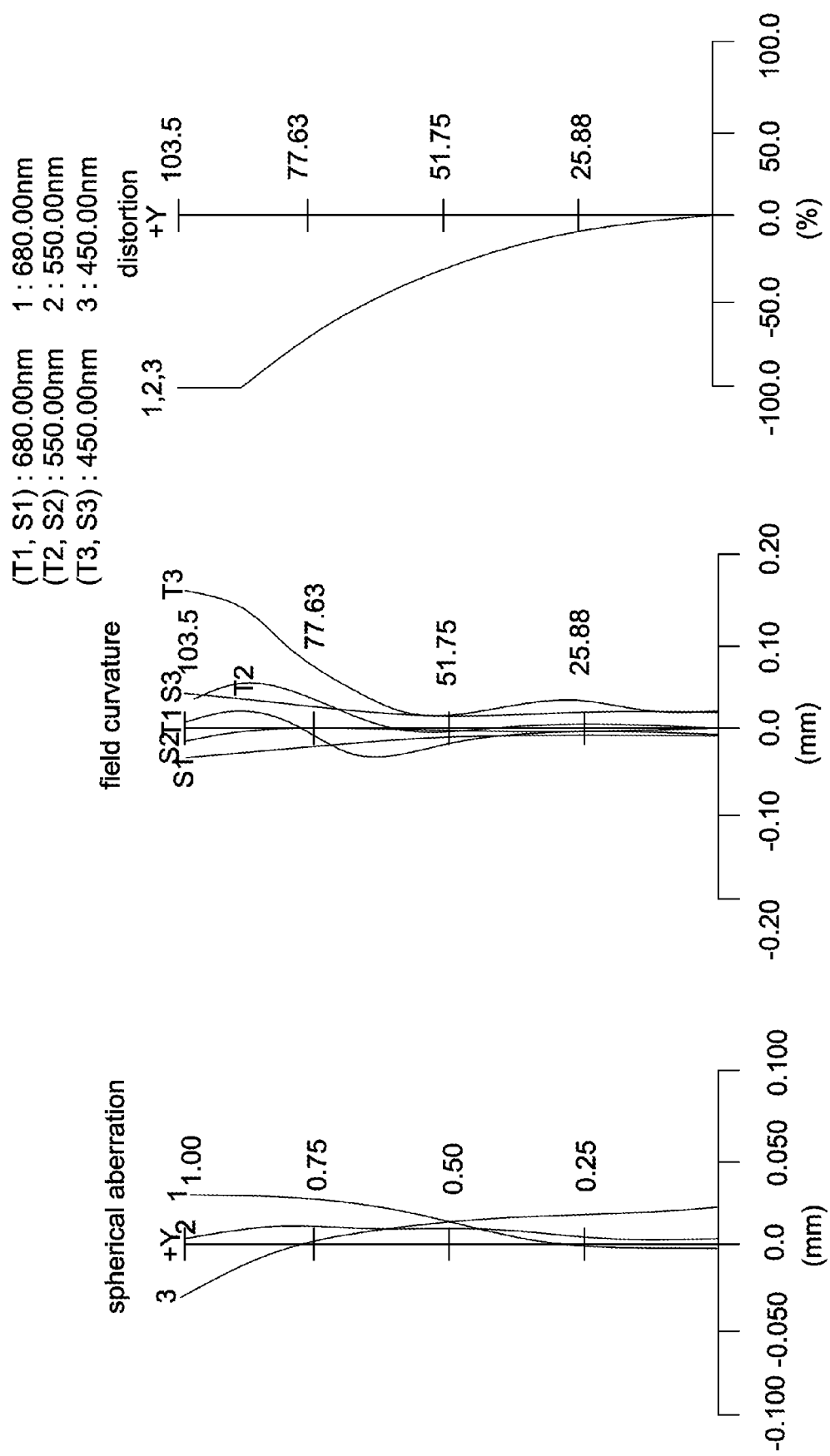
FIG. 18 illustrates spherical aberration, field curvature and distortion plots of the optical lens shown in FIG. 17.
Figure 19:
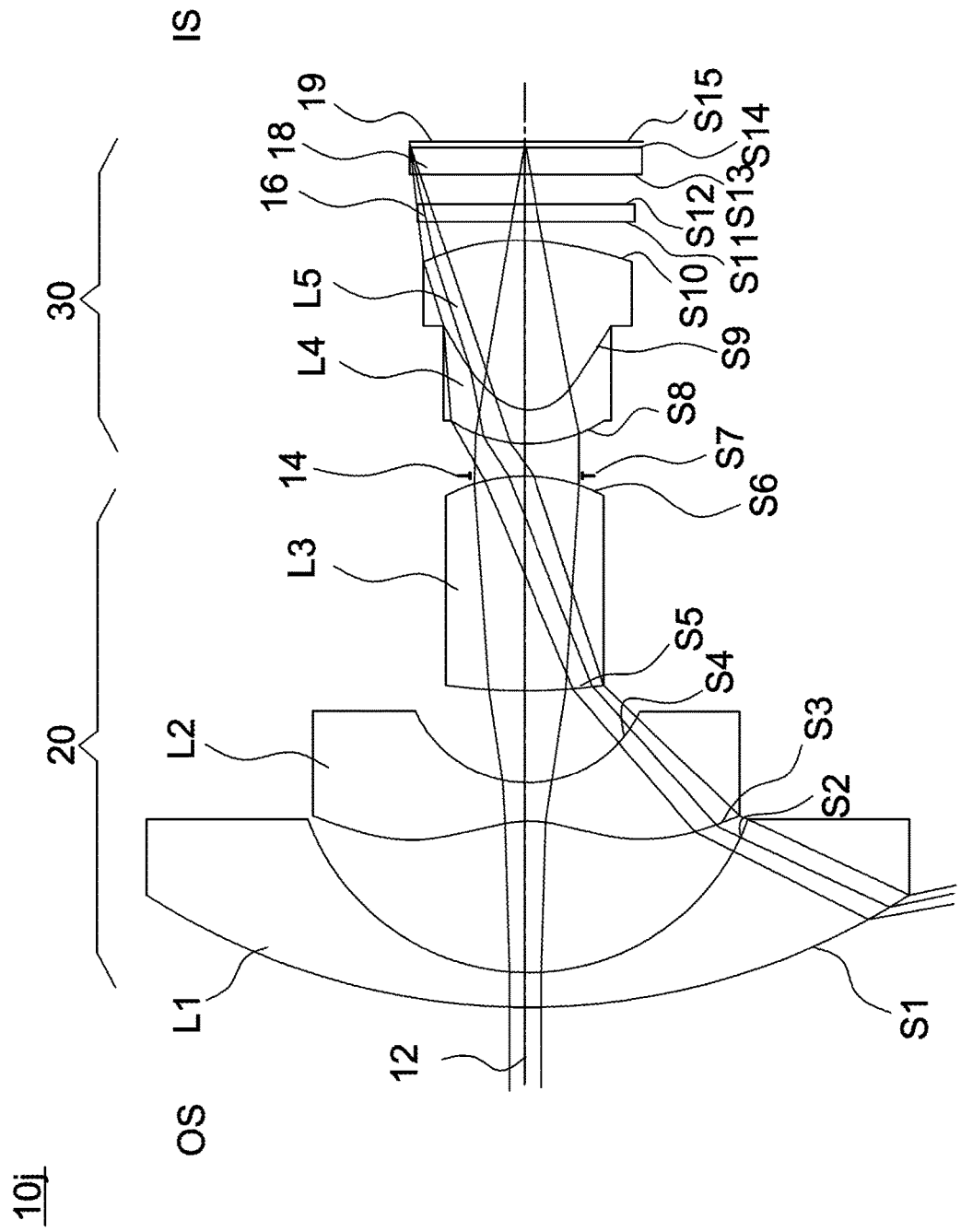
FIG. 19 shows a cross-sectional illustration of another optical lens according to an embodiment of the invention.
Figure 20:
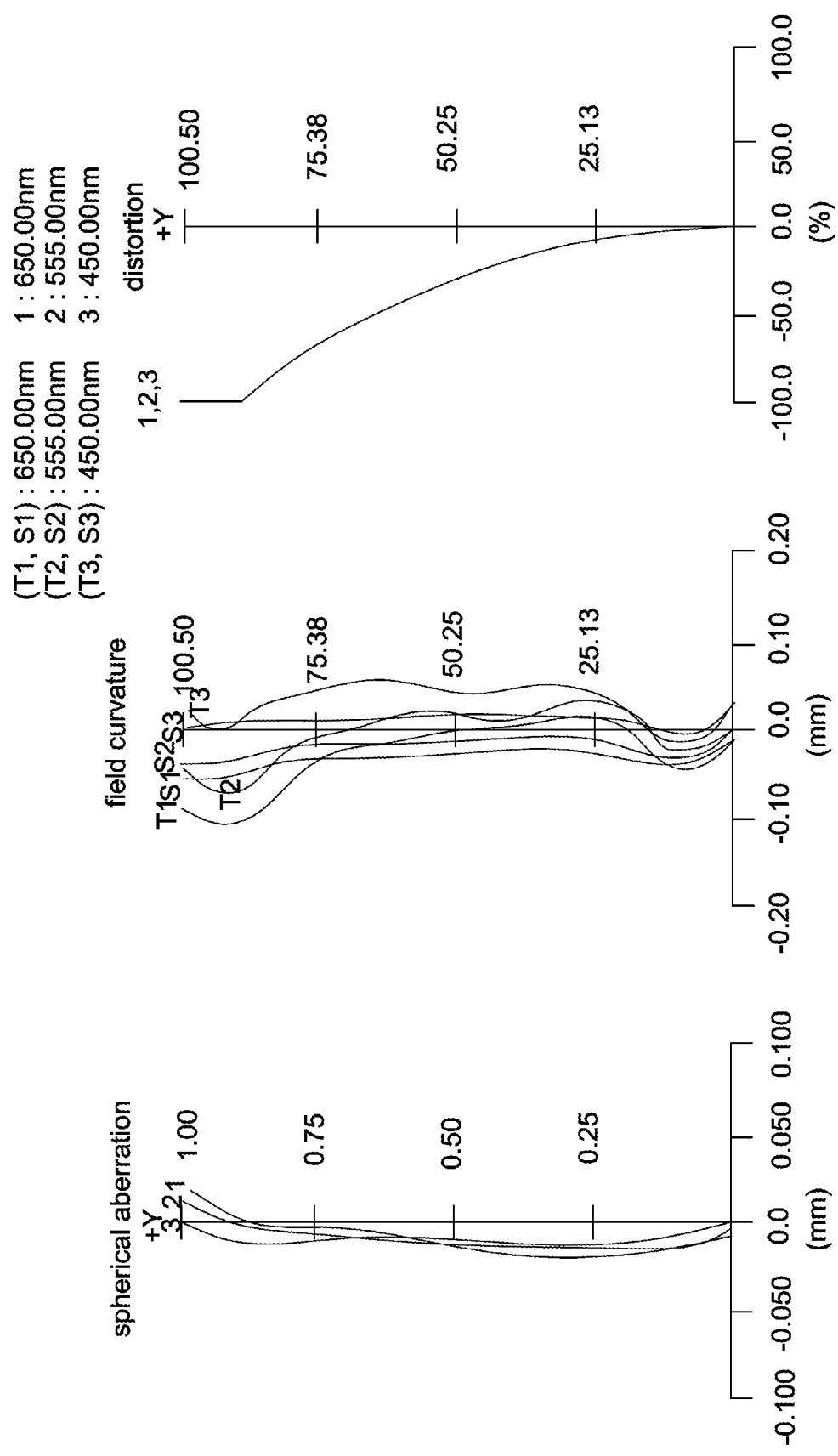
FIG. 20 illustrates spherical aberration, field curvature and distortion plots of the optical lens shown in FIG. 19.

FIG. 5 shows a cross-sectional illustration of an optical lens according to a third embodiment of the invention. The optical lens 10c shown in FIG. 5 includes a first lens L1, a second lens L2, a third lens L3, an aperture stop 14, a fourth lens L4 and a fifth lens L5. The first lens L1, the second lens L2, and the third lens L3 form a first lens group 20 (such as a front lens group) with a negative refractive power, and the fourth lens L4 and the fifth lens L5 form a second lens group 30 (such as a rear lens group) with a positive refractive power. In this embodiment, the refractive powers of the first lens L1 to the fifth lens L5 are negative, negative, positive, negative and positive, the second lens L2, the third lens L3, the fourth lens L4 and the fifth lens L5 are aspheric lenses made from plastic or glass. Further, in this embodiment, the diameter D1 of the surface S1 is 12.92 mm, and the diameter DL of the surface S11 is 2.76 mm. Detailed optical data and design parameters of the optical lens 10c are shown in Table 5 below.

TABLE 5

F/# = 2.0; EFL = 0.834(mm); TTL = 14.5(mm)
LT = 11.665; FOV = 215 degrees; DL/LT = 0.24
EFL/LT = 0.07; IMH = 1.935(mm)

| surface | radius of curvature (mm) | interval (mm) | refractive index | Abbe number | object description |
|---|---|---|---|---|---|
| S1 | 11.547 | 0.646 | 1.87 | 40.7 | L1(meniscus) |
| S2 | 4.198 | 2.419 | | | |
| S3* | −5.136 | 1.161 | 1.54 | 56.0 | L2(aspheric) |
| S4* | 2.076 | 1.549 | | | |
| S5* | 10.032 | 2.647 | 1.66 | 20.4 | L3(aspheric) |
| S6* | −4.610 | 0.812 | | | |
| S7 | INF. | 0.474 | | | aperture stop 14 |
| S8* | 15.312 | 0.500 | 1.66 | 20.4 | L4(aspheric) |
| S9* | 1.801 | 0.030 | | | |
| S10* | 1.541 | 1.427 | 1.54 | 56.0 | L5(aspheric) |
| S11* | −1.519 | 0.533 | | | |
| S12 | INF. | 0.210 | 1.52 | 64.1 | IR filter 16 |
| S13 | INF. | 1.646 | | | |
| S14 | INF. | 0.400 | 1.52 | 64.1 | cover glass 18 |
| S15 | INF. | 0.045 | | | |
| S16 | | | | | image plane 19 |

Table 6 lists aspheric coefficients and conic constant of each aspheric surface of the optical lens 10c according to the third embodiment of the invention.

TABLE 6

| | S3* | S4* | S5* | S6* |
|---|---|---|---|---|
| k | 0.000 | 0.000 | 0.000 | 0.000 |
| AR4 | 7.255E−02 | 6.978E−02 | 1.710E−02 | 1.232E−02 |
| AR6 | −1.440E−02 | 1.402E−01 | 2.491E−03 | −4.867E−04 |
| AR8 | 1.444E−03 | −1.240E−01 | −3.918E−03 | −1.849E−03 |
| AR10 | −8.000E−05 | 4.116E−02 | 1.661E−03 | 2.923E−04 |
| AR12 | 2.335E−06 | −6.260E−03 | −2.591E−04 | 0.000E+00 |
| AR14 | −2.743E−08 | 3.350E−04 | 0.000E+00 | 0.000E+00 |
| AR16 | 0.000E+00 | 0.000E+00 | 0.000E+00 | 0.000E+00 |
| AR18 | 0.000E+00 | 0.000E+00 | 0.000E+00 | 0.000E+00 |
| AR20 | 0.000E+00 | 0.000E+00 | 0.000E+00 | 0.000E+00 |
| | S8* | S9* | S10* | S11* |
| k | 0.000 | 0.000 | 0.000 | 0.000 |
| AR4 | 2.275E−02 | −1.588E−01 | −2.587E−01 | 3.004E−02 |
| AR6 | −1.322E−01 | 5.965E−02 | 1.648E−01 | 1.431E−02 |
| AR8 | 1.563E−01 | −1.351E−02 | −1.068E−01 | −3.521E−02 |
| AR10 | −1.185E−01 | −3.637E−03 | 4.536E−02 | 4.742E−02 |
| AR12 | 3.054E−02 | 0.000E+00 | −9.294E−03 | −2.734E−02 |
| AR14 | 0.000E+00 | 0.000E+00 | 0.000E+00 | 6.684E−03 |
| AR16 | 0.000E+00 | 0.000E+00 | 0.000E+00 | 0.000E+00 |

TABLE 6-continued

| | | | | |
|---|---|---|---|---|
| AR18 | 0.000E+00 | 0.000E+00 | 0.000E+00 | 0.000E+00 |
| AR20 | 0.000E+00 | 0.000E+00 | 0.000E+00 | 0.000E+00 |

In the above Table 5, an interval of the surface S1 is a distance between the surface S1 and the surface S2 along the optical axis 12, an interval of the surface S2 is a distance between the surface S2 and the surface S3 along the optical axis 12, and an interval of the surface S15 is a distance between the surface S15 and the image plane 19 for visible light along the optical axis 12. The optical lens 10c may have three lenses with an Abbe number of greater than 55.

FIGS. 7, 9, 11, 13, 15, 17 and 19 respectively show cross-sectional illustrations of optical lenses 10d, 10e, 10f, 10g, 10h, 10i and 10j according to various embodiments of the invention. The detailed optical data and design parameters of the optical lenses 10d, 10e, 10f, 10g, 10h, 10i and 10j are respectively shown in Tables 7, 9, 11, 13, 15, 17 and 19 below. Tables 8, 10, 12, 14, 16, 18 and 20 list aspheric coefficients and conic constant of each aspheric surface of the optical lenses 10d, 10e, 10f, 10g, 10h, 10i and 10j, respectively.

TABLE 7

| surface | radius of curvature (mm) | interval (mm) | refractive index | Abbe number | object description |
|---|---|---|---|---|---|
| S1 | 12.051 | 0.630 | 1.80 | 39.6 | L1(meniscus) |
| S2 | 3.803 | 2.026 | | | |
| S3* | 90.962 | 0.758 | 1.51 | 56.8 | L2(aspheric) |
| S4* | 1.337 | 1.723 | | | |
| S5* | −12.427 | 2.088 | 1.54 | 56.0 | L3(aspheric) |
| S6* | 6.022 | 0.100 | | | |
| S7* | 1.805 | 1.023 | 1.64 | 23.0 | L4(aspheric) |
| S8* | −3.641 | 0.100 | | | |
| S9 | INF. | 0.256 | | | aperture stop 14 |
| S10* | 20.383 | 0.604 | 1.64 | 23.1 | L5(aspheric) |
| S11* | 0.573 | 3.015 | 1.54 | 56.0 | L6(aspheric) |
| S12* | −1.486 | 0.100 | | | |
| S13* | INF. | 0.210 | 1.52 | 64.1 | IR filter 16 |
| S14 | INF. | 1.205 | | | |
| S15 | INF. | 0.400 | 1.52 | 64.1 | cover glass 18 |

TABLE 7-continued

| surface | radius of curvature (mm) | interval (mm) | refractive index | Abbe number | object description |
|---|---|---|---|---|---|
| S16 | INF. | 0.045 | | | |
| S17 | | | | | image plane 19 |

TABLE 8

| | S3* | S4* | S5* | S6* | S7* |
|---|---|---|---|---|---|
| k | −46.838 | −0.587 | −24.722 | −31.527 | 0.823 |
| AR4 | −9.221E−03 | −6.826E−02 | −6.273E−02 | −1.185E−01 | −4.445E−02 |
| AR6 | 4.511E−03 | 4.154E−02 | 2.857E−02 | 2.611E−02 | 1.491E−02 |
| AR8 | −8.833E−04 | −5.328E−02 | −4.191E−02 | −8.234E−04 | −2.948E−04 |
| AR10 | 1.075E−04 | 5.375E−02 | 3.912E−02 | −2.119E−04 | −7.139E−03 |
| AR12 | −7.869E−06 | −2.977E−02 | −2.164E−02 | 0.000E+00 | 3.512E−03 |
| AR14 | 3.097E−07 | 8.498E−03 | 6.165E−03 | 0.000E+00 | 5.362E−05 |
| AR16 | −4.854E−09 | −9.702E−04 | −6.795E−04 | 0.000E+00 | 0.000E+00 |
| AR18 | 0.000E+00 | 0.000E+00 | 0.000E+00 | 0.000E+00 | 0.000E+00 |
| AR20 | 0.000E+00 | 0.000E+00 | 0.000E+00 | 0.000E+00 | 0.000E+00 |

| | S8* | S10* | S11* | S12* |
|---|---|---|---|---|
| k | −28.215 | 89.777 | −0.942 | −0.368 |
| AR4 | 1.859E−01 | 1.748E−01 | 1.280E−01 | 5.618E−02 |
| AR6 | −7.617E−02 | −3.893E−01 | −9.108E−01 | −1.484E−03 |
| AR8 | 1.678E−01 | 7.875E−01 | 1.568E+00 | −1.108E−02 |
| AR10 | −3.063E−01 | −1.366E+00 | −1.637E+00 | 1.382E−02 |
| AR12 | 5.950E−01 | 1.716E+00 | 1.055E+00 | −7.127E−03 |
| AR14 | −7.587E−01 | −1.254E+00 | −3.796E−01 | 1.824E−03 |
| AR16 | 4.435E−01 | 3.865E−01 | 5.785E−02 | −1.835E−04 |
| AR18 | 0.000E+00 | 0.000E+00 | 0.000E+00 | 0.000E+00 |
| AR20 | 0.000E+00 | 0.000E+00 | 0.000E+00 | 0.000E+00 |

TABLE 9

| surface | radius of curvature (mm) | interval (mm) | refractive index | Abbe number | object description |
|---|---|---|---|---|---|
| S1 | 10.157 | 0.630 | 1.87 | 40.7 | L1(meniscus) |
| S2 | 3.957 | 2.062 | | | |
| S3* | 45.072 | 0.847 | 1.51 | 56.8 | L2(aspheric) |
| S4* | 1.146 | 1.976 | | | |
| S5* | −23.265 | 2.568 | 1.64 | 23.2 | L3(aspheric) |
| S6* | −2.404 | 0.100 | | | |
| S7 | INF. | 0.834 | | | aperture stop 14 |
| S8* | 2.589 | 0.613 | 1.64 | 23.1 | L4(aspheric) |
| S9* | 0.604 | 2.911 | 1.54 | 56.0 | L5(aspheric) |
| S10* | −2.053 | 0.100 | | | |
| S11 | INF. | 0.210 | 1.52 | 64.1 | IR filter 16 |
| S12 | INF. | 1.205 | | | |
| S13 | INF. | 0.400 | 1.52 | 64.1 | cover glass 18 |
| S14 | INF. | 0.045 | | | |
| S15 | | | | | image plane 19 |

TABLE 10

| | S3* | S4* | S5* | S6* |
|---|---|---|---|---|
| k | 68.539 | −0.556 | 52.121 | 0.657 |
| AR4 | 2.525E−02 | 1.092E−02 | −2.673E−02 | 8.604E−04 |
| AR6 | −1.009E−02 | 3.961E−02 | −1.389E−02 | −1.259E−02 |
| AR8 | 2.123E−03 | −2.895E−02 | 2.478E−02 | 5.107E−02 |
| AR10 | −2.609E−04 | 1.769E−02 | −3.578E−02 | −7.993E−02 |
| AR12 | 1.898E−05 | −8.351E−03 | 2.313E−02 | 6.525E−02 |
| AR14 | −7.609E−07 | 3.603E−03 | −7.457E−03 | −2.612E−02 |

TABLE 10-continued

| | | | | |
|---|---|---|---|---|
| AR16 | 1.298E−08 | −7.497E−04 | 7.783E−04 | 4.053E−03 |
| AR18 | 0.000E+00 | 0.000E+00 | 0.000E+00 | 0.000E+00 |
| AR20 | 0.000E+00 | 0.000E+00 | 0.000E+00 | 0.000E+00 |

| | S8* | S9* | S10* |
|---|---|---|---|
| k | −3.672 | −0.917 | 0.048 |
| AR4 | −2.797E−02 | −2.439E−01 | 3.521E−02 |
| AR6 | 2.379E−02 | 1.576E−01 | 1.295E−02 |
| AR8 | −1.077E−02 | −1.179E−01 | −2.402E−02 |
| AR10 | −7.420E−03 | 6.355E−02 | 1.883E−02 |
| AR12 | 1.598E−02 | −1.868E−02 | −7.828E−03 |
| AR14 | −9.783E−03 | 1.862E−03 | 1.717E−03 |
| AR16 | 2.071E−03 | 8.833E−05 | −1.573E−04 |
| AR18 | 0.000E+00 | 0.000E+00 | 0.000E+00 |
| AR20 | 0.000E+00 | 0.000E+00 | 0.000E+00 |

TABLE 11

| surface | radius of curvature (mm) | interval (mm) | refractive index | Abbe number | object description |
|---|---|---|---|---|---|
| S1 | 10.569 | 0.630 | 1.91 | 35.3 | L1(meniscus) |
| S2 | 3.916 | 2.564 | | | |
| S3* | −3.739 | 1.063 | 1.54 | 56.0 | L2(aspheric) |
| S4* | 1.855 | 1.436 | | | |
| S5* | 9.461 | 2.344 | 1.64 | 23.5 | L3(aspheric) |
| S6* | −2.735 | 0.730 | | | |
| S7 | INF. | 0.100 | | | aperture stop 14 |
| S8* | 6.075 | 1.514 | 1.54 | 56.0 | L4(aspheric) |
| S9* | −1.173 | 0.464 | 1.64 | 23.5 | L5(aspheric) |
| S10* | 11.304 | 0.100 | | | |
| S11* | 2.834 | 1.595 | 1.54 | 56.0 | L6(aspheric) |
| S12* | −2.058 | 0.100 | | | |
| S13 | INF. | 0.210 | 1.52 | 64.1 | IR filter 16 |
| S14 | INF. | 1.205 | | | |
| S15 | INF. | 0.400 | 1.52 | 64.1 | cover glass 18 |
| S16 | INF. | 0.045 | | | |
| S17 | | | | | image plane 19 |

TABLE 12

| | S3* | S4* | S5* | S6* | S8* |
|---|---|---|---|---|---|
| k | 0.000 | 0.000 | 0.000 | 0.000 | 0.000 |
| AR4 | 6.537E−02 | 7.252E−02 | 1.813E−03 | 3.035E−02 | 6.968E−02 |
| AR6 | −1.567E−02 | 3.770E−02 | 1.419E−02 | −1.002E−02 | −2.332E−02 |
| AR8 | 2.719E−03 | −2.743E−02 | −1.420E−02 | 2.241E−03 | 3.728E−02 |
| AR10 | −3.299E−04 | 1.128E−02 | 7.335E−03 | −2.291E−04 | −4.086E−02 |
| AR12 | 2.596E−05 | −6.205E−03 | −2.148E−03 | 0.000E+00 | 1.888E−02 |
| AR14 | −1.162E−06 | 1.781E−03 | 2.421E−04 | 0.000E+00 | 0.000E+00 |
| AR16 | 2.260E−08 | −1.916E−04 | 0.000E+00 | 0.000E+00 | 0.000E+00 |
| AR18 | 0.000E+00 | 0.000E+00 | 0.000E+00 | 0.000E+00 | 0.000E+00 |
| AR20 | 0.000E+00 | 0.000E+00 | 0.000E+00 | 0.000E+00 | 0.000E+00 |

| | S9* | S10* | S11* | S12* |
|---|---|---|---|---|
| k | 0.000 | 0.000 | 0.000 | 0.000 |
| AR4 | −3.639E−01 | −1.952E−02 | 5.920E−04 | 4.346E−02 |
| AR6 | 7.845E−02 | 2.232E−02 | −3.108E−03 | 1.440E−02 |
| AR8 | 2.108E−01 | −7.608E−03 | 1.035E−03 | −3.350E−03 |
| AR10 | −1.131E−01 | 1.226E−03 | −1.040E−04 | 2.809E−04 |
| AR12 | 0.000E+00 | 0.000E+00 | 0.000E+00 | 5.849E−05 |
| AR14 | 0.000E+00 | 0.000E+00 | 0.000E+00 | 0.000E+00 |
| AR16 | 0.000E+00 | 0.000E+00 | 0.000E+00 | 0.000E+00 |
| AR18 | 0.000E+00 | 0.000E+00 | 0.000E+00 | 0.000E+00 |
| AR20 | 0.000E+00 | 0.000E+00 | 0.000E+00 | 0.000E+00 |

TABLE 13

| surface | radius of curvature (mm) | interval (mm) | refractive index | Abbe number | object description |
|---|---|---|---|---|---|
| S1 | 13.295 | 1.086 | 1.73 | 54.1 | L1(meniscus) |
| S2 | 3.827 | 2.012 | | | |
| S3* | 4.885 | 1.107 | 1.54 | 56.0 | L2(aspheric) |
| S4* | 0.751 | 0.918 | | | |
| S5* | 2.175 | 2.792 | 1.66 | 20.4 | L3(aspheric) |
| S6* | 6.911 | 0.268 | | | |
| S7 | 4.204 | 1.658 | 1.44 | 95.0 | aperture stop 14/L4 (bi-convex) |
| S8 | −1.596 | 0.306 | | | |
| S9* | 7.214 | 0.822 | 1.54 | 56.0 | L5(aspheric) |
| S10* | −3.472 | 0.100 | | | |
| S11 | INF. | 0.210 | 1.52 | 64.2 | IR filter 16 |
| S12 | INF. | 1.459 | | | |
| S13 | INF. | 0.400 | 1.52 | 64.2 | cover glass 18 |
| S14 | INF. | 0.045 | | | |
| S15 | | | | | image plane 19 |

TABLE 14

| | S3* | S4* | S5* | S6* |
|---|---|---|---|---|
| k | −1.280 | −0.985 | −3.129 | 0.000 |
| AR4 | −1.855E−02 | −4.028E−02 | 3.239E−02 | 3.972E−02 |
| AR6 | 1.643E−03 | 1.046E−02 | 6.621E−03 | 1.276E−01 |
| AR8 | −8.625E−05 | −4.937E−03 | −2.684E−03 | −2.445E−01 |
| AR10 | 2.524E−06 | 7.835E−04 | 3.108E−04 | 2.392E−01 |
| AR12 | −3.314E−08 | −1.229E−05 | 5.519E−06 | −9.444E−26 |
| AR14 | 1.310E−10 | 6.213E−07 | 6.681E−06 | 0.000E+00 |
| AR16 | 0.000E+00 | 0.000E+00 | 0.000E+00 | 0.000E+00 |
| AR18 | 0.000E+00 | 0.000E+00 | 0.000E+00 | 0.000E+00 |
| AR20 | 0.000E+00 | 0.000E+00 | 0.000E+00 | 0.000E+00 |

| | S9* | S10* |
|---|---|---|
| k | 20.100 | 2.978 |
| AR4 | −7.888E−03 | 3.743E−02 |
| AR6 | −4.631E−02 | −3.690E−02 |

TABLE 14-continued

| | | |
|---|---|---|
| AR8 | 4.617E−02 | 2.833E−02 |
| AR10 | −3.220E−02 | −1.243E−02 |
| AR12 | 1.174E−02 | 2.746E−03 |
| AR14 | −1.936E−03 | −2.143E−04 |
| AR16 | 0.000E+00 | 0.000E+00 |
| AR18 | 0.000E+00 | 0.000E+00 |
| AR20 | 0.000E+00 | 0.000E+00 |

TABLE 15

| surface | radius of curvature (mm) | interval (mm) | refractive index | Abbe number | object description |
|---|---|---|---|---|---|
| S1 | 10.235 | 1.067 | 1.95 | 32.3 | L1(meniscus) |
| S2 | 3.183 | 2.015 | | | |
| S3* | 10.713 | 0.924 | 1.54 | 56.0 | L2(aspheric) |
| S4* | 1.065 | 1.873 | | | |
| S5 | 4.942 | 1.628 | 1.76 | 27.5 | L3(bi-convex) |
| S6 | −4.942 | 1.124 | | | |
| S7 | INF. | 0.072 | | | aperture stop 14 |
| S8* | −146.369 | 0.843 | 1.54 | 56.0 | L4(aspheric) |
| S9* | −2.087 | 0.050 | | | |
| S10* | −14.987 | 0.600 | 1.64 | 23.5 | L5(aspheric) |
| S11* | 1.158 | 2.044 | 1.54 | 56.0 | L6(aspheric) |
| S12* | −2.435 | 0.100 | | | |
| S13 | INF. | 0.210 | 1.52 | 64.2 | IR filter 16 |
| S14 | INF. | 1.506 | | | |
| S15 | INF. | 0.400 | 1.52 | 64.2 | cover glass 18 |
| S16 | INF. | 0.044 | | | |
| S17 | | | | | image plane 19 |

TABLE 16

| | S3* | S4* | S8* | S9* |
|---|---|---|---|---|
| k | 0.000 | −0.960 | 0.000 | 0.000 |
| AR4 | −1.296E−02 | 7.637E−03 | −2.894E−02 | −2.295E−02 |
| AR6 | 1.441E−03 | −2.172E−03 | −1.850E−02 | 3.607E−02 |
| AR8 | −1.021E−04 | 2.472E−04 | 1.574E−02 | −3.704E−02 |
| AR10 | 3.131E−06 | −5.152E−04 | −1.332E−02 | 1.092E−02 |
| AR12 | −4.096E−21 | 8.981E−25 | −4.370E−28 | −4.443E−27 |
| AR14 | 0.000E+00 | 0.000E+00 | 0.000E+00 | 0.000E+00 |
| AR16 | 0.000E+00 | 0.000E+00 | 0.000E+00 | 0.000E+00 |
| AR18 | 0.000E+00 | 0.000E+00 | 0.000E+00 | 0.000E+00 |
| AR20 | 0.000E+00 | 0.000E+00 | 0.000E+00 | 0.000E+00 |

| | S10* | S11* | S12* |
|---|---|---|---|
| k | 0.000 | −0.656 | −0.677 |
| AR4 | −3.194E−02 | −1.641E−02 | −4.009E−03 |
| AR6 | 2.222E−02 | −4.412E−02 | 4.881E−05 |
| AR8 | −2.404E−02 | 9.714E−03 | −2.793E−04 |
| AR10 | 9.259E−03 | −1.934E−03 | 2.366E−04 |
| AR12 | −5.368E−26 | 3.045E−25 | 5.544E−05 |
| AR14 | 0.000E+00 | 1.148E−32 | 4.003E−28 |
| AR16 | 0.000E+00 | 0.000E+00 | 0.000E+00 |
| AR18 | 0.000E+00 | 0.000E+00 | 0.000E+00 |
| AR20 | 0.000E+00 | 0.000E+00 | 0.000E+00 |

TABLE 17

| surface | radius of curvature (mm) | interval (mm) | refractive index | Abbe number | object description |
|---|---|---|---|---|---|
| S1 | 9.155 | 0.650 | 1.95 | 32.3 | L1(meniscus) |
| S2 | 3.119 | 2.483 | | | |
| S3* | −4.590 | 0.802 | 1.53 | 55.4 | L2(aspheric) |
| S4* | 2.093 | 2.040 | | | |
| S5 | 4.610 | 2.130 | 1.90 | 31.3 | L3(bi-convex) |
| S6 | −5.331 | 0.064 | | | |
| S7 | INF. | 1.084 | | | aperture stop 14 |
| S8* | 4.448 | 0.525 | 1.64 | 23.2 | L4(aspheric) |
| S9* | 0.711 | 0.008 | 1.50 | 65.0 | adhesive |
| S10* | 0.711 | 2.300 | 1.53 | 56.0 | L5(aspheric) |
| S11* | −2.134 | 0.372 | | | |
| S12 | INF. | 0.300 | 1.52 | 64.2 | IR filter 16 |
| S13 | INF. | 1.302 | | | |
| S14 | INF. | 0.400 | 1.52 | 64.2 | cover glass 18 |
| S15 | INF. | 0.045 | | | |
| S16 | | | | | image plane 19 |

TABLE 18

| | S3* | S4* | S8* | S9* |
|---|---|---|---|---|
| k | −18.532 | −3.833 | −17.822 | −0.965 |
| AR4 | 4.990E−03 | 8.744E−02 | −2.517E−02 | −9.415E−02 |
| AR6 | −5.330E−04 | −1.432E−02 | −6.305E−03 | 5.561E−03 |
| AR8 | 2.986E−05 | 8.402E−03 | 1.034E−03 | 0.000E+00 |
| AR10 | −1.840E−06 | −8.942E−04 | 0.000E+00 | 0.000E+00 |
| AR12 | −5.997E−09 | −3.432E−04 | 0.000E+00 | 0.000E+00 |
| AR14 | 1.158E−08 | 8.628E−05 | 0.000E+00 | 0.000E+00 |
| AR16 | 0.000E+00 | 0.000E+00 | 0.000E+00 | 0.000E+00 |
| AR18 | 0.000E+00 | 0.000E+00 | 0.000E+00 | 0.000E+00 |
| AR20 | 0.000E+00 | 0.000E+00 | 0.000E+00 | 0.000E+00 |

| | S10* | S11* |
|---|---|---|
| k | −0.965 | −1.735 |
| AR4 | −9.415E−02 | −1.283E−02 |
| AR6 | 5.561E−03 | −9.163E−03 |
| AR8 | 0.000E+00 | 5.607E−03 |
| AR10 | 0.000E+00 | −2.305E−03 |
| AR12 | 0.000E+00 | 5.510E−04 |
| AR14 | 0.000E+00 | −7.434E−05 |
| AR16 | 0.000E+00 | 0.000E+00 |
| AR18 | 0.000E+00 | 0.000E+00 |
| AR20 | 0.000E+00 | 0.000E+00 |

TABLE 19

| surface | radius of curvature (mm) | interval (mm) | refractive index | Abbe number | object description |
|---|---|---|---|---|---|
| S1 | 11.944 | 0.600 | 1.70 | 55.5 | L1(meniscus) |
| S2 | 3.950 | 2.478 | | | |
| S3* | −2.396 | 0.700 | 1.51 | 56.8 | L2(aspheric) |
| S4* | 5.821 | 1.563 | | | |
| S5* | 9.036 | 3.581 | 1.61 | 26.0 | L3(aspheric) |
| S6* | −4.267 | −0.082 | | | |
| S7 | INF. | 0.661 | | | aperture stop 14 |
| S8* | 1.681 | 0.544 | 1.64 | 23.1 | L4(aspheric) |
| S9* | 0.620 | 2.835 | 1.53 | 55.4 | L5(aspheric) |
| S10* | −2.317 | 0.352 | | | |
| S11 | INF. | 0.300 | 1.52 | 64.2 | IR filter 16 |
| S12 | INF. | 0.527 | | | |
| S13 | INF. | 0.400 | 1.52 | 64.2 | cover glass 18 |
| S14 | INF. | 0.045 | | | |
| S15 | | | | | image plane 19 |

TABLE 20

| | S3* | S5* | S6* | S8* |
|---|---|---|---|---|
| k | −13.687 | 12.285 | −1.340 | −0.149 |
| AR4 | 1.538E−02 | −2.162E−02 | −5.499E−02 | −8.593E−02 |
| AR6 | −1.367E−03 | 1.293E−03 | 2.627E−02 | 1.969E−02 |
| AR8 | 5.913E−05 | 2.850E−04 | −1.363E−02 | −8.101E−03 |
| AR10 | −9.730E−07 | −1.294E−03 | 4.561E−03 | 6.129E−04 |

TABLE 20-continued

| | | | | |
|---|---|---|---|---|
| AR12 | 0.000E+00 | 0.000E+00 | 0.000E+00 | 0.000E+00 |
| ARM | 0.000E+00 | 0.000E+00 | 0.000E+00 | 0.000E+00 |
| AR16 | 0.000E+00 | 0.000E+00 | 0.000E+00 | 0.000E+00 |
| AR18 | 0.000E+00 | 0.000E+00 | 0.000E+00 | 0.000E+00 |
| AR20 | 0.000E+00 | 0.000E+00 | 0.000E+00 | 0.000E+00 |

| | S4* | S9* | S10* |
|---|---|---|---|
| k | 7.755E+00 | −1.031E+00 | −4.416E+01 |
| AR1 | 0.000E+00 | 0.000E+00 | 0.000E+00 |
| AR2 | 0.000E+00 | 0.000E+00 | 1.644E−01 |
| AR3 | 0.000E+00 | 4.580E−02 | −1.935E−01 |
| AR4 | 1.503E−01 | −7.514E−02 | 5.056E−02 |
| AR5 | −3.632E−02 | −9.335E−02 | −2.653E−02 |
| AR6 | −6.418E−02 | 1.296E−01 | 6.820E−02 |
| AR7 | −6.090E−03 | 6.053E−03 | −9.894E−02 |
| AR8 | 6.541E−02 | −6.847E−02 | 1.050E−01 |
| AR9 | 0.00743858 | 0.03240348 | −0.074004127 |
| AR10 | −0.0346061 | −0.0096494 | 0.031358759 |
| AR11 | −0.001 | 0.012 | −0.010 |
| AR12 | 0.010 | −0.014 | 0.002 |
| AR13 | −2.635E−04 | 8.136E−03 | 3.436E−04 |
| AR14 | −1.078E−03 | −1.894E−03 | −2.738E−04 |

Table 21 lists various design parameters of the optical lenses 10a-10j according to the first to the tenth embodiments. The definition of each parameter listed in Table 21 has been described in earlier sections, thus not repeatedly described here for brevity.

TABLE 21

| Optical lens | Cemented lens | Refractive power | Material (G: glass/P: plastic) | EFL for visible light (mm) |
|---|---|---|---|---|
| 10a | L5&L6 | −−−+−+ | G P P G P P | 0.896 |
| 10b | | −−++−+ | G P G P P P | 0.811 |
| 10c | | −−+−+ | G P P P P | 0.834 |
| 10d | L5&L6 | −−−+−+ | G P P P P P | 0.885 |
| 10e | L4&L5 | −−+−+ | G P P P P | 0.872 |
| 10f | L4&L5 | −−++−+ | G P P P P P | 0.848 |
| 10g | | −−+++ | G P P G P | 0.905 |
| 10h | L5&L6 | −−++−+ | G P G P P P | 1.011 |
| 10i | L4&L5 | −−+−+ | G P G P P | 1.105 |
| 10j | L4&L5 | −−+−+ | G P P P P | 1.203 |

| Optical lens | F# | FOV | TTL (mm) | LT (mm) | IMH (mm) | D1 (mm) | DL (mm) | DL/LT | EFL/LT |
|---|---|---|---|---|---|---|---|---|---|
| 10a | 2 | 206 | 14.5 | 12.04 | 1.993 | 12.06 | 3.274 | 0.272 | 0.074 |
| 10b | 2 | 210 | 14.5 | 12.348 | 2.015 | 11.36 | 3.276 | 0.265 | 0.066 |
| 10c | 2 | 215 | 14.5 | 11.665 | 1.935 | 12.92 | 2.76 | 0.237 | 0.071 |
| 10d | 2 | 206 | 14.282 | 12.322 | 2.06 | 12.0 | 3.326 | 0.270 | 0.072 |
| 10e | 2 | 206 | 14.5 | 12.54 | 2.075 | 12.0 | 3.394 | 0.271 | 0.070 |
| 10f | 2 | 215 | 14.5 | 12.54 | 2.12 | 12.0 | 3.532 | 0.282 | 0.068 |
| 10g | 2 | 218 | 13.18 | 10.97 | 2.01 | 12.84 | 3.198 | 0.292 | 0.082 |
| 10h | 2 | 218 | 14.5 | 12.24 | 1.998 | 11.13 | 3.232 | 0.264 | 0.083 |
| 10i | 2 | 207 | 14.5 | 12.087 | 2.01 | 10.01 | 3.08 | 0.255 | 0.091 |
| 10j | 2.1 | 201 | 14.5 | 12.88 | 1.963 | 12.76 | 3.418 | 0.265 | 0.093 |

FIGS. 2, 4, 6, 8, 10, 12, 14, 16, 18 and 20 illustrate spherical aberration, field curvature and distortion plots of the optical lenses 10a, 10b, 10c, 10d, 10e, 10f, 10g, 10h, 10i and 10j, respectively. The simulated results shown in FIGS. 2, 4, 6, 8, 10, 12, 14, 16, 18 and 20 are within permitted ranges specified by the standard, which indicates the optical lenses 10a-10j according to the above embodiments may achieve good imaging quality.

According to the above embodiments, the optical lens may achieve high optical performance, low thermal shift, wide viewing angles, low fabrication costs and good imaging quality. Further, a total number of lenses can be reduced to 5-8, and a total track length TTL can be decreased to be smaller than 18 mm. Therefore, an optical lens having large effective aperture, high resolution, wide viewing angles, low thermal shift, reduced occupied space, low fabrication costs and good imaging quality can be provided.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of all lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. An optical lens, comprising:
   a first lens group comprising three lenses with refractive powers, two of the three lenses of the first lens group being made from glass, and the three lenses comprising a spherical lens and an aspheric lens;
   a second lens group having a positive refractive power and comprising two lenses with refractive powers, and the two lenses comprising an aspheric lens; and
   an aperture stop disposed between the first lens group and the second lens group, wherein a total number of lenses in the optical lens is less than 9, and the optical lens satisfies the conditions:

$0.2 < DL/LT < 0.38$; and $0.05 < EFL/LT < 0.1$, where DL is a diameter of a lens surface of the second lens group furthest from the first lens group, EFL is an effective focal length of the optical lens, and LT is a length measured on the optical axis between two outermost lens surfaces of the optical lens,
   wherein the optical lens comprises, in order from a magnified side to a minified side of the optical lens, a meniscus lens, an aspheric lens, an aspheric lens, an aspheric lens and an aspheric lens.

2. The optical lens as claimed in claim 1, wherein an F-number of the optical lens is larger than or equal to 1.8.

3. The optical lens as claimed in claim 1, wherein a full field of view of the optical lens is greater than 190 degrees and smaller than 230 degrees.

4. The optical lens as claimed in claim 1, wherein the optical lens comprises three lenses with an Abbe number of greater than 50.

5. The optical lens as claimed in claim 1, wherein the optical lens comprises a cemented lens having a lens with an Abbe number of greater than 50.

6. The optical lens as claimed in claim 1, wherein the optical lens comprises a cemented lens having an aspheric joint surface.

7. The optical lens as claimed in claim 1, wherein a total track length of the optical lens measured between a lens surface furthest from an image plane and the image plane is smaller than 18 mm.

8. The optical lens as claimed in claim 1, wherein the optical lens comprises a doublet lens or a triplet lens.

9. The optical lens as claimed in claim 1, wherein a lens furthest from an image plane of the optical lens is made from glass.

10. An optical lens, comprising:
a first lens group comprising three lenses with refractive powers, two of the three lenses of the first lens group being made from glass, and the three lenses comprising a spherical lens and an aspheric lens;
a second lens group having a positive refractive power and comprising two lenses with refractive powers, and the two lenses comprising an aspheric lens; and
an aperture stop disposed between the first lens group and the second lens group, wherein a total number of lenses in the optical lens is less than 9, and the optical lens satisfies the conditions:

0.2<DL/LT<0.38; and 0.05<EFL/LT<0.1, where DL is a diameter of a lens surface of the second lens group furthest from the first lens group, EFL is an effective focal length of the optical lens, and LT is a length measured on the optical axis between two outermost lens surfaces of the optical lens,
wherein the optical lens comprises, in order from a magnified side to a minified side, a meniscus lens, an aspheric lens, an aspheric lens, a bi-convex lens and an aspheric lens.

11. The optical lens as claimed in claim 10, wherein wherein an F-number of the optical lens is larger than or equal to 1.8.

12. An optical lens, comprising:
a first lens group comprising three lenses with refractive powers, two of the three lenses of the first lens group being made from glass, and the three lenses comprising a spherical lens and an aspheric lens;
a second lens group having a positive refractive power and comprising two lenses with refractive powers, and the two lenses comprising an aspheric lens; and
an aperture stop disposed between the first lens group and the second lens group, wherein a total number of lenses in the optical lens is less than 9, and the optical lens satisfies the conditions:

0.2<DL/LT<0.38; and 0.05<EFL/LT<0.1, where DL is a diameter of a lens surface of the second lens group furthest from the first lens group, EFL is an effective focal length of the optical lens, and LT is a length measured on the optical axis between two outermost lens surfaces of the optical lens,
wherein the optical lens has six lenses with refractive powers of negative, negative, negative, positive, negative and positive.

13. The optical lens as claimed in claim 12, wherein an F-number of the optical lens is larger than or equal to 1.8.

14. The optical lens as claimed in claim 12, wherein a full field of view of the optical lens is greater than 190 degrees and smaller than 230 degrees.

15. The optical lens as claimed in claim 12, wherein the optical lens comprises three lenses with an Abbe number of greater than 50.

16. The optical lens as claimed in claim 12, wherein the optical lens comprises a cemented lens having a lens with an Abbe number of greater than 50.

17. The optical lens as claimed in claim 12, wherein the optical lens comprises a cemented lens having an aspheric joint surface.

18. The optical lens as claimed in claim 12, wherein a total track length of the optical lens measured between a lens surface furthest from an image plane and the image plane is smaller than 18 mm.

19. The optical lens as claimed in claim 12, wherein the optical lens comprises a doublet lens or a triplet lens.

20. The optical lens as claimed in claim 12, wherein a lens furthest from an image plane of the optical lens is made from glass.

* * * * *